(12) United States Patent
Miyakubo et al.

(10) Patent No.: US 6,336,436 B1
(45) Date of Patent: Jan. 8, 2002

(54) COMPRESSION AUTOIGNITION GASOLINE ENGINE

(75) Inventors: Hiroshi Miyakubo; Koudai Yoshizawa, both of Kanagawa; Tomonori Urushihara; Atsushi Teraji, both of Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/661,407

(22) Filed: Sep. 13, 2000

(30) Foreign Application Priority Data

Sep. 14, 1999 (JP) .............................. 11-261002
Sep. 6, 2000 (JP) ........................ 2000-270170

(51) Int. Cl.⁷ .............................................. F02B 17/00
(52) U.S. Cl. ..................................... 123/295; 123/90.15
(58) Field of Search ............................. 123/90.15, 295, 123/305, 294

(56) References Cited

U.S. PATENT DOCUMENTS 4,397,270 A  8/1983  Aoyama .................. 123/90.16
6,267,097 B1 * 7/2001 Urushihara et al. ....... 123/90.15
6,276,316 B1 * 8/2001 Arai et al. ................. 123/90.15

FOREIGN PATENT DOCUMENTS

JP   9-203307    8/1997
JP   10-252512   9/1998

* cited by examiner

Primary Examiner—John T. Kwon
(74) Attorney, Agent, or Firm—Foley & Lardner

(57) ABSTRACT

A gasoline engine has an actuating system including an in-cylinder fuel injection system and an ignition system, capable of changing over combustion between spark ignition combustion and compression autoignition combustion, and a controlling system for controlling the combustion changeover. In a transition from one combustion to the other, the actuating system is controlled to perform transient combustion such as stratified charge combustion with fuel injection on the compression stroke, or combustion with fuel injection during a valve shutoff period during which intake and exhaust valves are both closed.

26 Claims, 18 Drawing Sheets

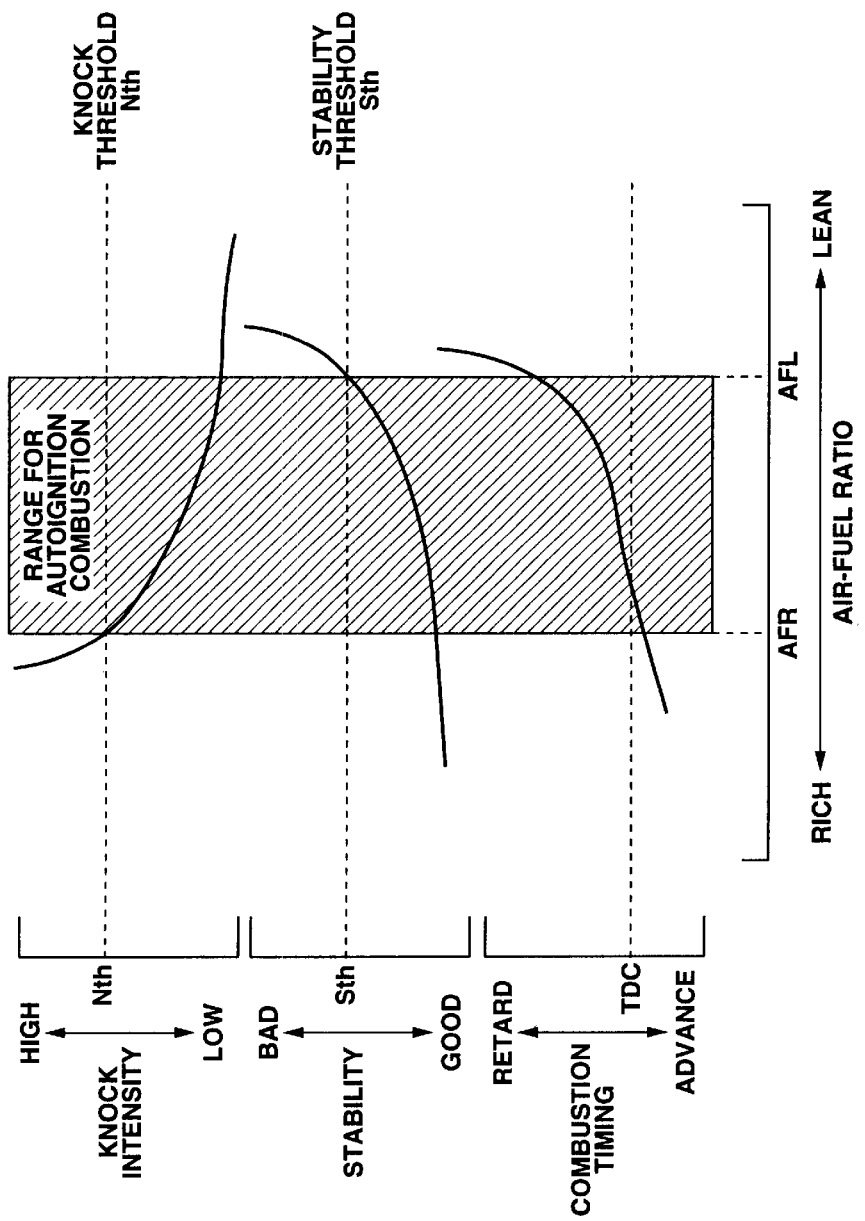

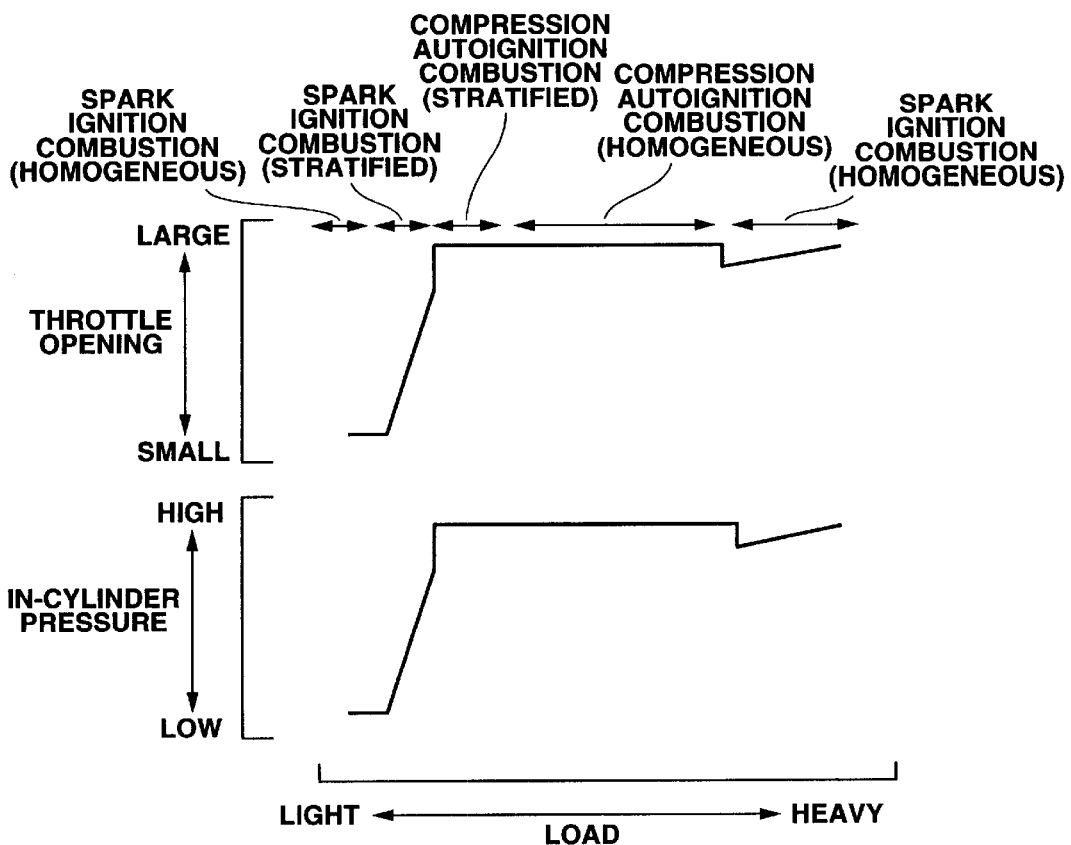
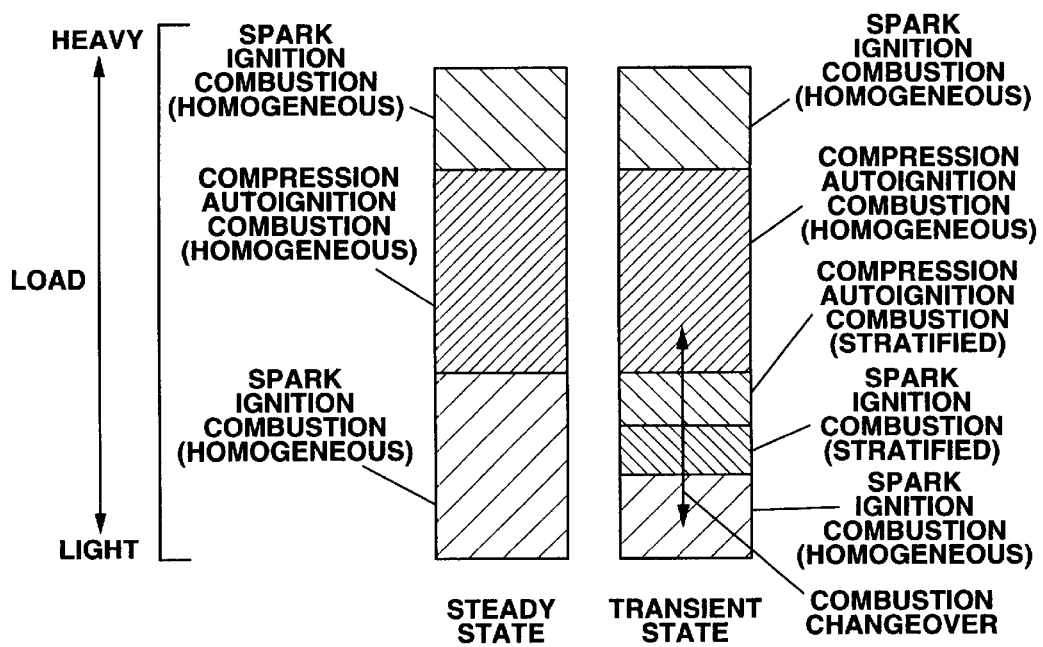

<SPARK IGNITION>

<COMPRESSION AUTOIGNITION>

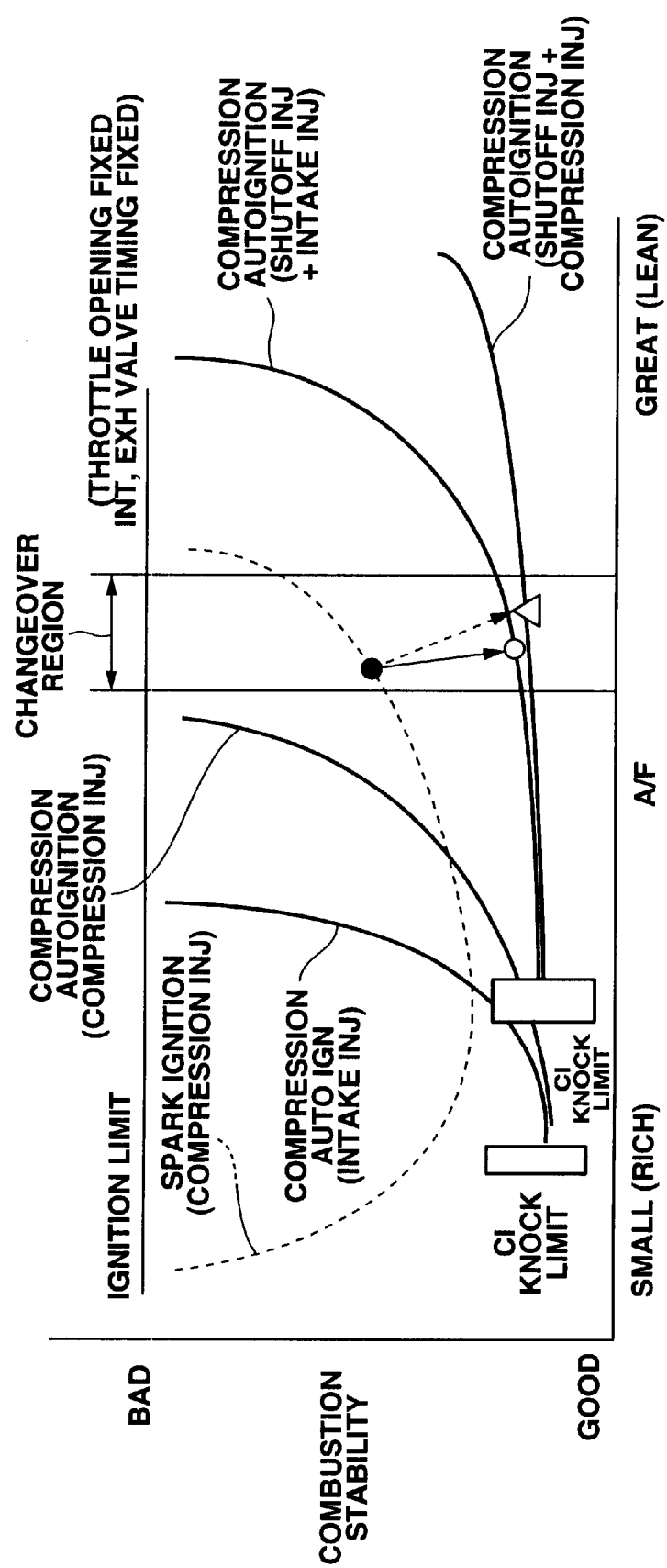

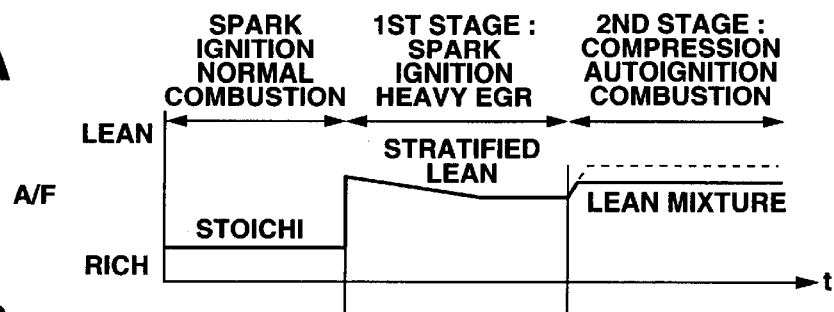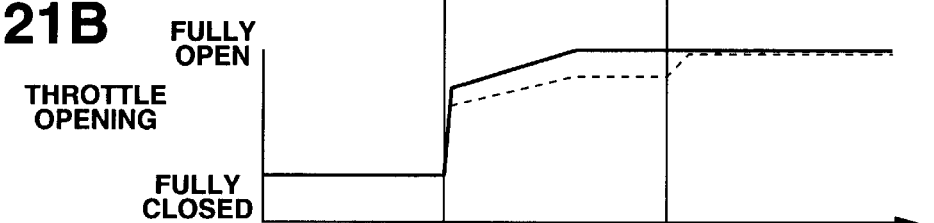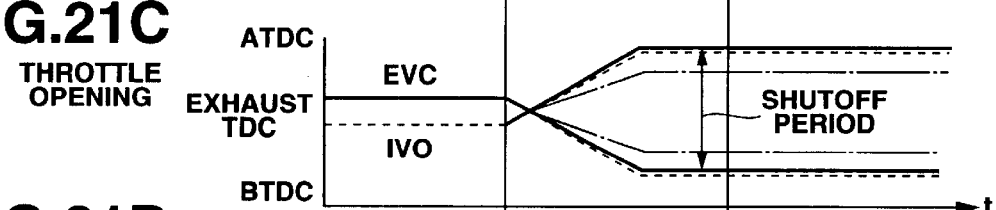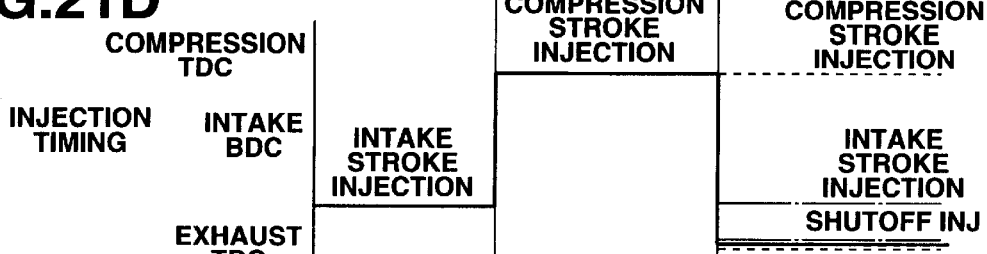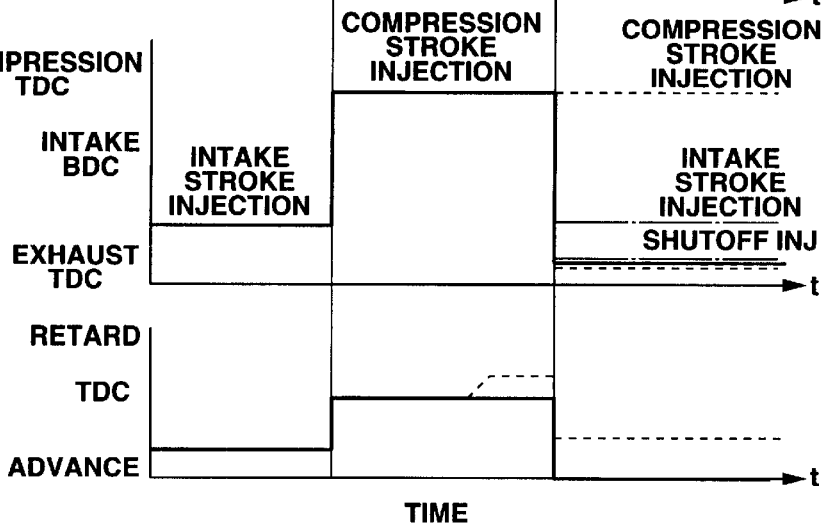

COMPRESSION AUTOIGNITION GASOLINE ENGINE

BACKGROUND OF THE INVENTION

The present invention relates to a compression autoignition gasoline engine selectively using spark ignition combustion and compression auto (or self) ignition combustion in accordance with engine operating conditions.

In the compression autoignition combustion, combustion starts at a plurality of points in a combustion chamber, so that the combustion speed is high, and the stability in combustion is high even in a lean state as compared to the ordinary spark ignition combustion. Therefore, the compression autoignition combustion makes it possible to improve the fuel consumption, and significantly reduce the amount of NOx in exhaust gases by lowering the combustion temperature with lean air fuel ratio. The amount of NOx can be further reduced with an air fuel mixture of a uniform air fuel ratio prepared by preliminarily mixing fuel and air.

An engine system performing spark ignition combustion in high speed, high load regions and performing compression autoignition combustion in low speed, low and medium load regions is able to achieve high output at the time of high speed and high load, and simultaneous to achieve improvement of the fuel consumption and reduction of NOx at the time of low speed and low or medium load.

However, in an engine system in which the base compression ratio is increased to obtain the temperature and pressure of air fuel mixture adequate for the compression autoignition combustion, the intake air quantity is decreased or the ignition timing is retarded to prevent knocking in the spark ignition combustion, so that the specific output becomes lower.

A Japanese Published Patent Application Kokai No. 10(1998)-252512 shows an engine system performing compression autoignition combustion by providing a valve shut-off period during which intake and exhaust valves are both closed, for intake heating with internal EGR.

SUMMARY OF THE INVENTION

To change the opening and closing timings or the amounts of lift of intake and exhaust valves, a mechanical valve actuating mechanism disclosed in a Japanese Published Patent Application Kokai No. 9(1997)-203307 includes a camshaft having a plurality of cams of different profiles, and a hydraulic actuating piston to change the states of rocker arm's engaging levers confronting the cams, respectively. This valve actuating mechanism requires several combustion cycles from an operation of an oil pressure control valve to an end of changeover to another rocker arm.

To initiate the compression autoignition combustion by heating the intake air with internal EGR (exhaust gas recirculation), it is necessary to securely initiate the compression autoignition combustion by increasing the amount of internal EGR in a combustion cycle next to the last spark ignition combustion cycle. If, in the next combustion cycle, the compression autoignition combustion is incomplete, the in-cylinder temperature and pressure become lower, and the difficulty to initiate the. compression autoignition combustion further grows.

If, in consideration of the slower response of the mechanical valve actuating mechanism, the amount of the internal EGR is increased before a combustion changeover, the possibility of knocking would be increased in the spark ignition combustion.

On the other hand, a delay in increase of the internal EGR quantity would render the compression autoignition combustion unstable, resulting in a decrease in the quantity of heat supplied by the internal EGR which would magnify the difficulty to regain the stable compression autoignition combustion.

In the case of combustion changeover from compression autoignition combustion to spark ignition combustion, a large amount of internal EGR would increase the in-cylinder temperature and thereby increase the possibility of knocking in the spark ignition combustion. A preliminary reduction of the internal EGR quantity to prevent knocking in the spark ignition combustion would render the compression autoignition combustion unstable before the combustion changeover.

Under some engine operating conditions, an intake pressure is varied in a combustion changeover between the spark ignition combustion and compression autoignition combustion. In this case, a change in the pressure also involves a response delay, and the adjustment of the intake pressure takes several cycles. Therefore, a low in-cylinder pressure renders unstable the compression autoignition combustion in changeover from the spark ignition combustion to the compression autoignition combustion, and a high in-cylinder pressure increases the possibility of knocking in the spark ignition combustion in changeover from the compression autoignition combustion to the spark ignition combustion.

Furthermore, the control of combustion changeover to avoid the combustion instability and knocking is influenced by various engine operating conditions at the time of a combustion changeover.

It is therefore an object of the present invention to provide a compression autoignition gasoline engine, and/or its combustion changeover control process, to achieve smooth and stable combustion changeover sufficiently free from instability and knocking between spark ignition combustion and compression autoignition combustion especially in a light load engine operating region.

It is another object of the present invention to provide system and/or process to achieve a stable combustion changeover between spark ignition combustion and compression autoignition combustion while restraining the occurrence of knocking even when a mechanical valve actuating mechanism is employed to vary valve timings.

According to the present invention, a compression autoignition gasoline engine comprises:

an actuating system comprising an in-cylinder fuel injection system to inject fuel directly into a combustion chamber, and an ignition system operative to change over combustion in the combustion chamber between spark ignition combustion and compression autoignition combustion in accordance with an engine operating condition; and a controlling system connected with the in-cylinder fuel injection system and the ignition system, to perform transient combustion in transition between the spark ignition combustion and the compression autoignition combustion. The transient combustion may be performed by temporarily changing a fuel injection timing. The transient combustion may be performed by injecting fuel directly into a combustion chamber during an intake valve closing period during which an intake valve is closed.

In illustrated embodiments of the present invention, the transient combustion is one of stratified charge combustion and combustion performed by injecting fuel during a valve shutoff period during which intake and exhaust valves are both closed.

The controlling system comprises a control unit or controller which may include, as a main component, a CPU forming a computer. The controlling system may further comprise one or more input devices such as sensors for collecting input information on one or more engine operating conditions.

A combustion changeover process according to the present invention, for a compression autoignition gasoline engine having an in-cylinder fuel injector, comprises: requesting a combustion changeover from first combustion which is one of spark ignition combustion and compression autoignition combustion to second combustion which is the other of the spark ignition combustion and the compression autoignition combustion, in accordance with an engine operating condition; and performing the transient combustion when the combustion changeover is requested.

BRIEF DESCRIPTION OF THE DRAWINGS

FIG. 3 is a graph for illustrating knocking intensity, stability and combustion timing with respect to the air-fuel ratio in compression autoignition combustion.

FIG. 7 is a graph for illustrating the throttle opening and in-cylinder pressure with respect to the load in the case of stratified charge compression autoignition combustion being employed.

FIG. 8 is a view for illustrating combustion states in steady state operation and transient operation in the compression autoignition gasoline engine of the first embodiment.

FIG. 20 is a graph for illustrating a stable compression autoignition combustion region in the case of combustion changeover.

FIGS. 21A~21E are time chart showing a process of combustion changeover in the third embodiment.

DETAILED DESCRIPTION OF THE INVENTION

Figure 1:
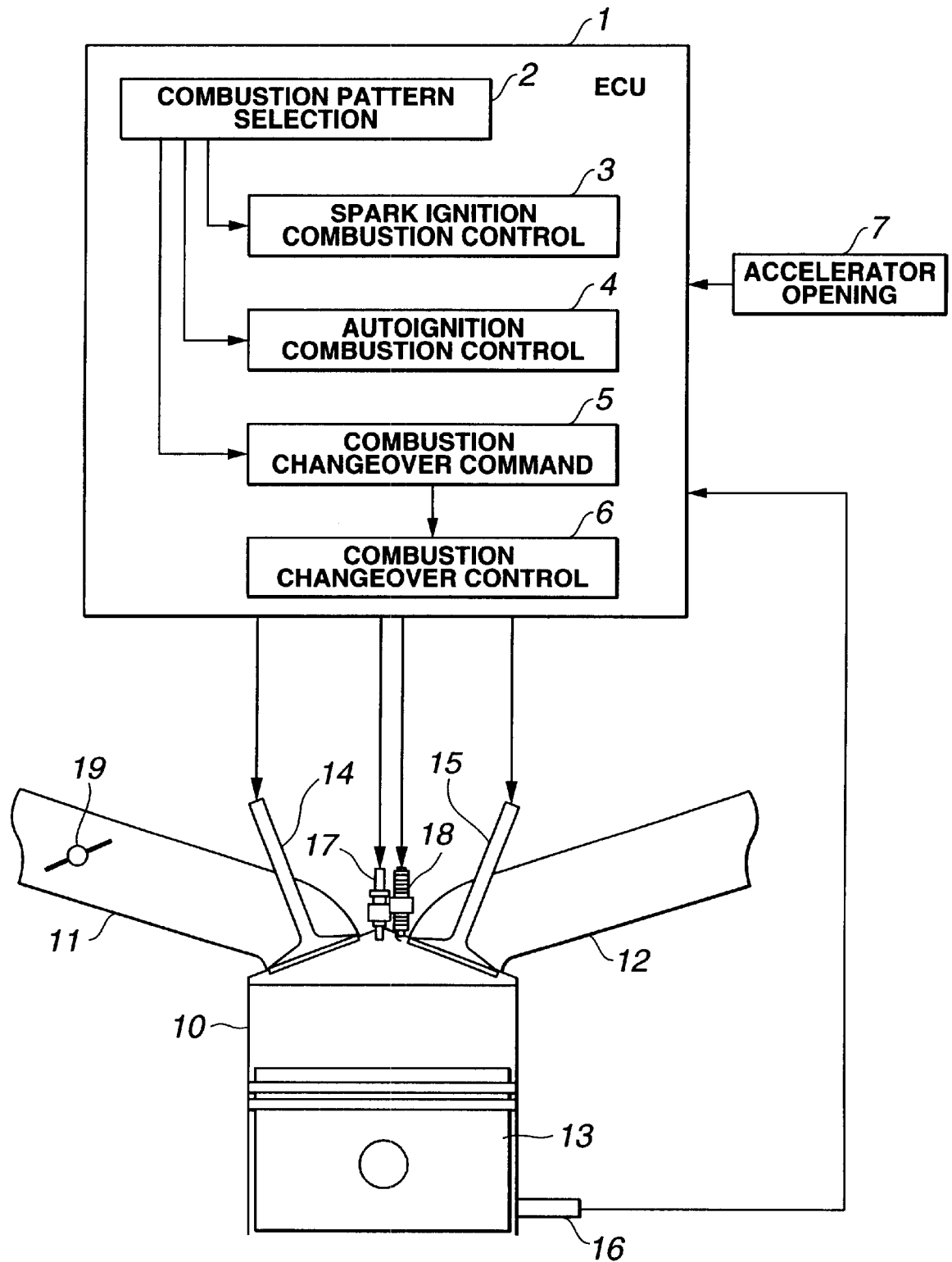
FIG. 1 is a schematic view showing a system of a compression autoignition gasoline engine according to a first embodiment of the present invention.

FIG. 1 shows a compression autoignition gasoline engine according to a first embodiment of the present invention, capable of selecting one of compression autoignition combustion and spark ignition combustion in accordance with engine operating conditions.

An engine main body (or engine proper or engine block assembly) 10 has at least one cylinder provided with an intake port 11, an exhaust port 12, a piston 13, an intake valve 14, and an exhaust valve 15. Engine main body 10 further has a crank angle sensor 16, a fuel injection system 17 and an ignition system including at least one spark plug 18, and an intake system including a throttle valve 19.

An electronic engine control unit (ECU) 1 for controlling the engine main body 10 has a combustion pattern selecting section 2 for selecting one combustion mode from a compression autoignition combustion mode and a spark ignition combustion mode in dependence on engine operating conditions, a spark ignition combustion control section 3 for controlling a combustion parameter at the time of the spark ignition combustion, a compression autoignition combustion control section 4 for controlling a combustion parameter at the time of the compression autoignition combustion, a combustion changeover commanding section 5 and a combustion changeover control section 6. These sections 2~6 in ECU 1 are implemented by program or programs of a microcomputer.

By receiving an engine speed signal from a crank angle sensor 16 and an accelerator opening signal (or load) from an accelerator opening sensor (or accelerator position sensor) 7, ECU 1 determines a current engine operating state and selects a combustion pattern in accordance with the engine operating state. Moreover, ECU 1 calculates a fuel injection quantity, a fuel injecting timing and an ignition timing in accordance with the engine operating state, and delivers control signals to fuel injection system 7 and ignition spark plug 18 to achieve the results of the calculation.

Throttle valve 19 for regulating an intake air quantity is located upstream of intake port 11. The intake system further includes an air flowmeter (not shown), an air cleaner and piping.

Figure 2:
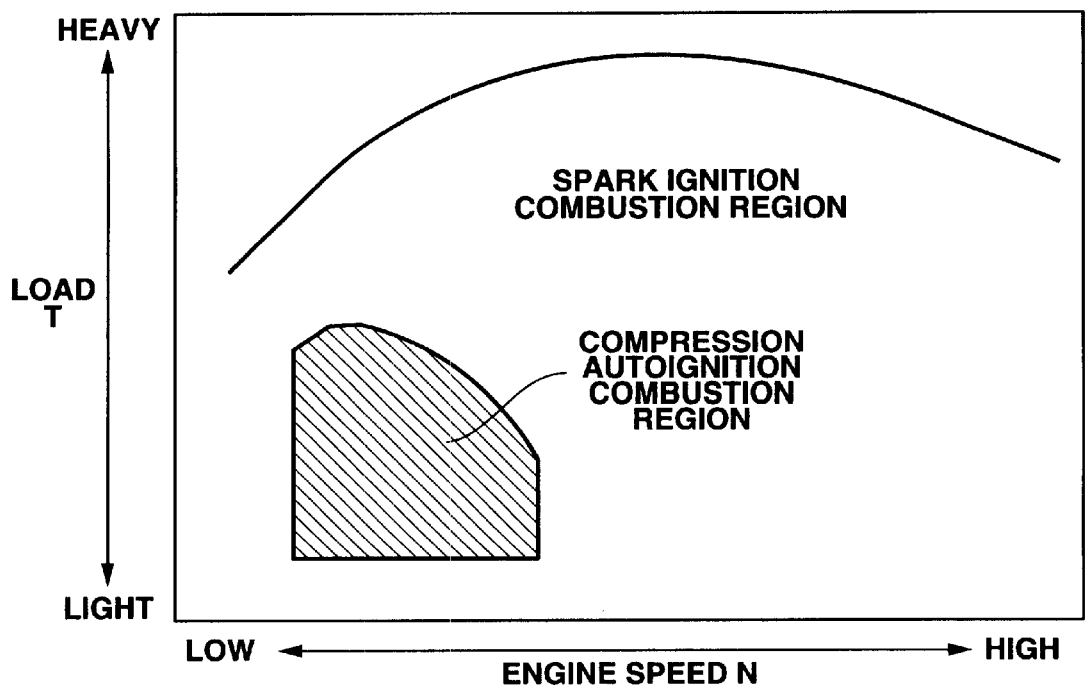
FIG. 2 is a graph for illustrating combustion patterns with respect to engine speed N and load T.

As shown in FIG. 2, the thus-constructed compression autoignition gasoline engine performs the compression autoignition combustion in a predetermined engine operating region of low speed and low and medium load, and performs the spark ignition combustion in a very low load region and in a region of high speed or high load.

The compression spontaneous ignition combustion engine according to the first embodiment is operated as follows:

FIG. 3 shows an air-fuel ratio range in which the autoignition combustion can be performed. The fuel injection timing is sufficiently advanced before TDC (top dead center), and the air and fuel are premixed. As the air-fuel ratio is made leaner, the combustion stability becomes worse, and fluctuation of engine torque increases. Therefore, a lean limit is at an air-fuel ratio AFL at which the combustion stability becomes equal to or worse than a predetermined stability threshold Sth representing an allowable stability limit determined by design requirements of an internal combustion engine or a vehicle powered by an internal combustion engine.

On the other hand, the intensity of knock increases as the air-fuel ratio is made richer. Therefore, a rich limit is at an air-fuel ratio AFR at which the knock intensity exceeds a knocking threshold (allowable knock level). The air-fuel ratio range for the compression autoignition combustion is defined between the stability limit AFL and the knocking limit AFR. The compression autoignition combustion is allowed only in this limited range. In FIG. 3, the air-fuel ratio is used as an index for indicating the degree of richness or leanness of gas-fuel mixture. When the residual gas or EGR gas is involved, the tendency is the same, and it is possible to use, instead of the air-fuel ratio, the gas-fuel ratio G/F between a total gas quantity of fresh air and burnt gas and a quantity of fuel.

FIG. 3 shows the range of the autoignition combustion with respect to the air fuel ratio as combustion parameter. With respect to other parameters such as temperature, intake pressure or boost pressure, the tendency is alike. The combustion stability decreases as the temperature decreases, and the knocking intensity increases as the temperature increases. As to the intake pressure or boost pressure, the combustion stability decreases as the pressure decreases, and the knocking intensity increases as the pressure increases. In order to sustain stable autoignition combustion, it is necessary or desirable to control the temperature and/or pressure in predetermined respective ranges.

Figure 4:
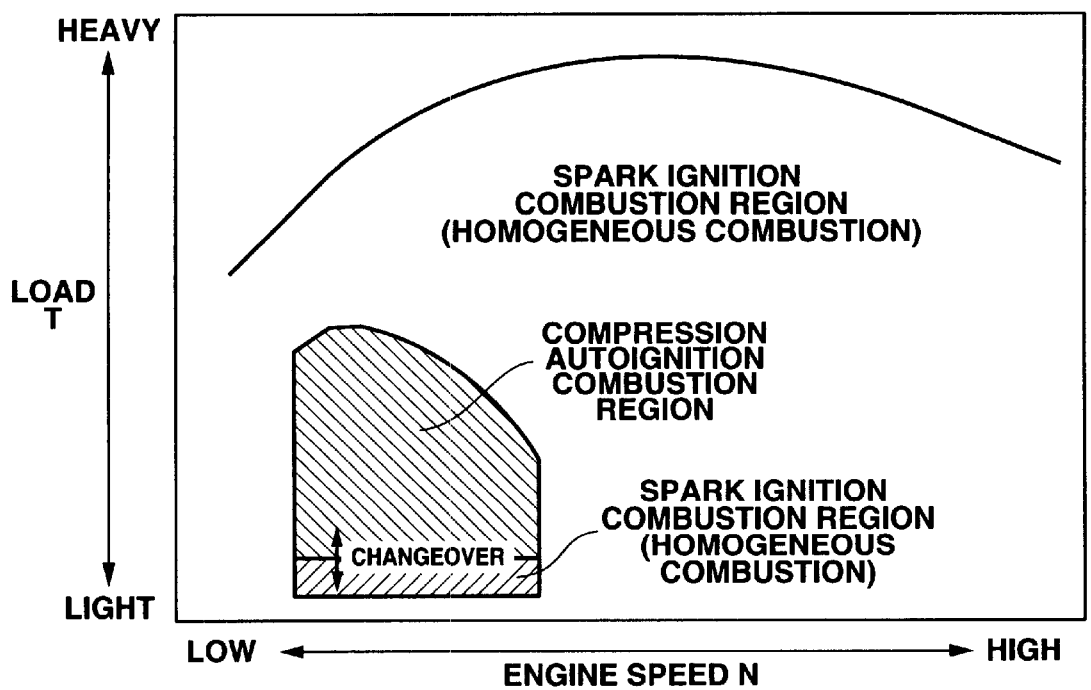
FIG. 4 is a graph for illustrating combustion changeover in the first embodiment.

FIG. 4 shows conditions for combustion changeover from the spark ignition combustion operation to the autoignition combustion operation. As shown in FIG. 4, there are two kinds of combustion pattern changeovers. One is a combustion changeover in a light load region from the spark ignition combustion to the compression autoignition combustion or from the compression autoignition combustion to the spark ignition combustion. The other is a combustion changeover in a heavy load region from the compression autoignition combustion to the spark ignition combustion, or from the spark ignition combustion to the compression autoignition combustion.

The present invention deals with the combustion changeover in the light load region.

Figure 5:
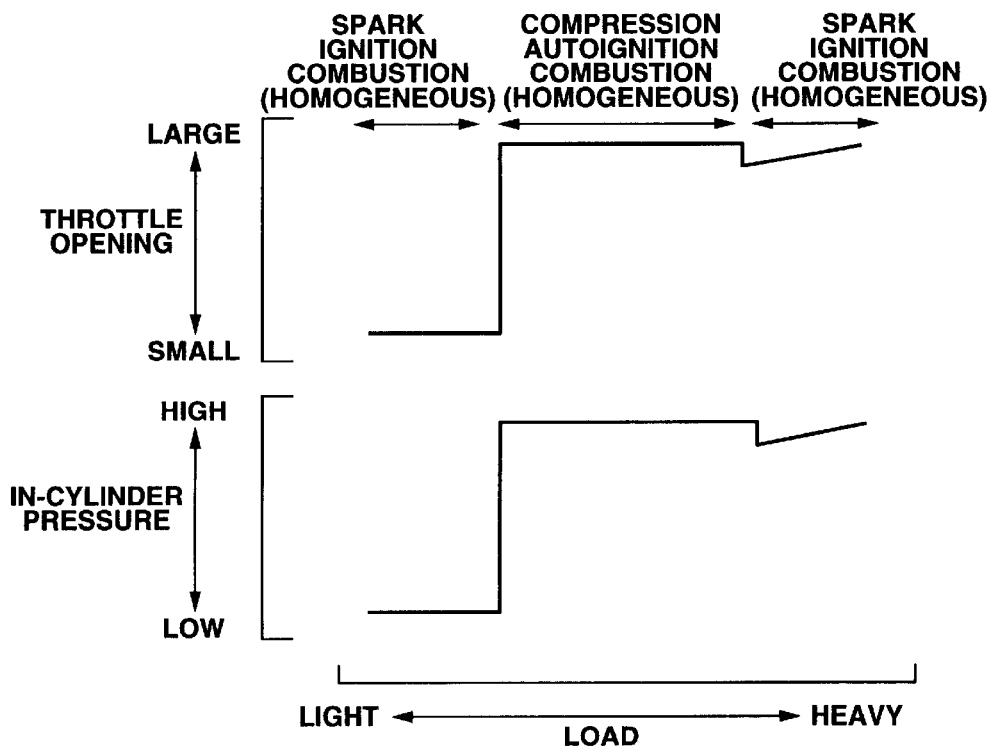
FIG. 5 is a graph for illustrating the throttle opening and in-cylinder pressure with respect to the load.

FIG. 5 shows the throttle opening (degree) and in-cylinder pressure with respect to the load. The spark ignition combustion is a homogenous charge stoichiometric combustion. In the case of combustion changeover in the light load region from the spark ignition combustion to the compression autoignition combustion, the throttle opening differs widely, and hence the in-cylinder pressure differs widely. When, therefore, the combustion is changed over to the compression autoignition mode, the in-cylinder pressure can be deficient and the combustion can be unstable as mentioned before.

Figure 6:
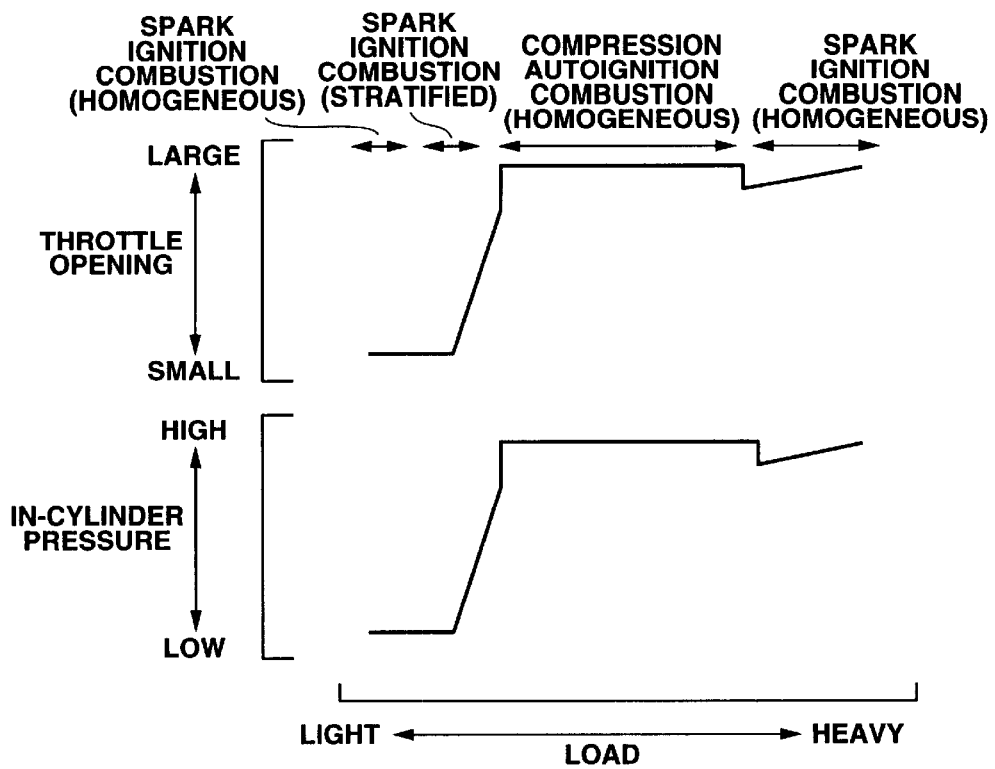
FIG. 6 is a graph for illustrating the throttle opening and in-cylinder pressure with respect to the load in the case of stratified charge spark ignition combustion being employed.

FIG. 6 shows the throttle opening (degree) and in-cylinder pressure with respect to the load when a stratified charge spark ignition combustion is interposed. In the stratified charge combustion, it is possible to make the air-fuel ratio lean while holding the air quantity at a large level. Therefore, the throttle opening can be increased, and the in-cylinder pressure can be held at a higher level as compared to the homogeneous charge stoichiometric combustion. In a combustion changeover, consequently, it is possible to bring the in-cylinder pressure quickly to a desired target value, and thereby to prevent the combustion from becoming unstable.

FIG. 7 shows the throttle opening (degree) and in-cylinder pressure with respect to the load when a stratified charge combustion is performed in the compression autoignition mode. By the use of the stratified charge combustion in the compression autoignition mode, it is possible to perform the compression autoignition combustion at lighter load levels, and to change over the combustion at lighter levels. In a combustion changeover at a lighter load level, an amount of fuel for combustion is decreased, so that the tendency to knocking is decreased for both the spark ignition combustion and compression autoignition combustion. The decrease of the amount of burnt fuel decreases the amount of heat generated in the combustion process, which decreases the possibility of knock even when the combustion parameters such as in-cylinder pressure and temperature deviate from desired values in the process of combustion changeover.

FIG. 8 shows combustion modes in combustion changeover. In the case of steady state operation of the engine, the engine performs stoichiometric homogeneous charge spark ignition combustion when the load is very light, and performs homogeneous charge compression autoignition combustion when the load is medium. In the case of transient state operation with change in the load, there appear, in the increasing order of the load, stoichiometric homogeneous charge spark ignition combustion, stratified charge spark ignition combustion, stratified charge compression autoignition combustion and homogeneous compression autoignition combustion, as shown in FIG. 8.

Figure 9:
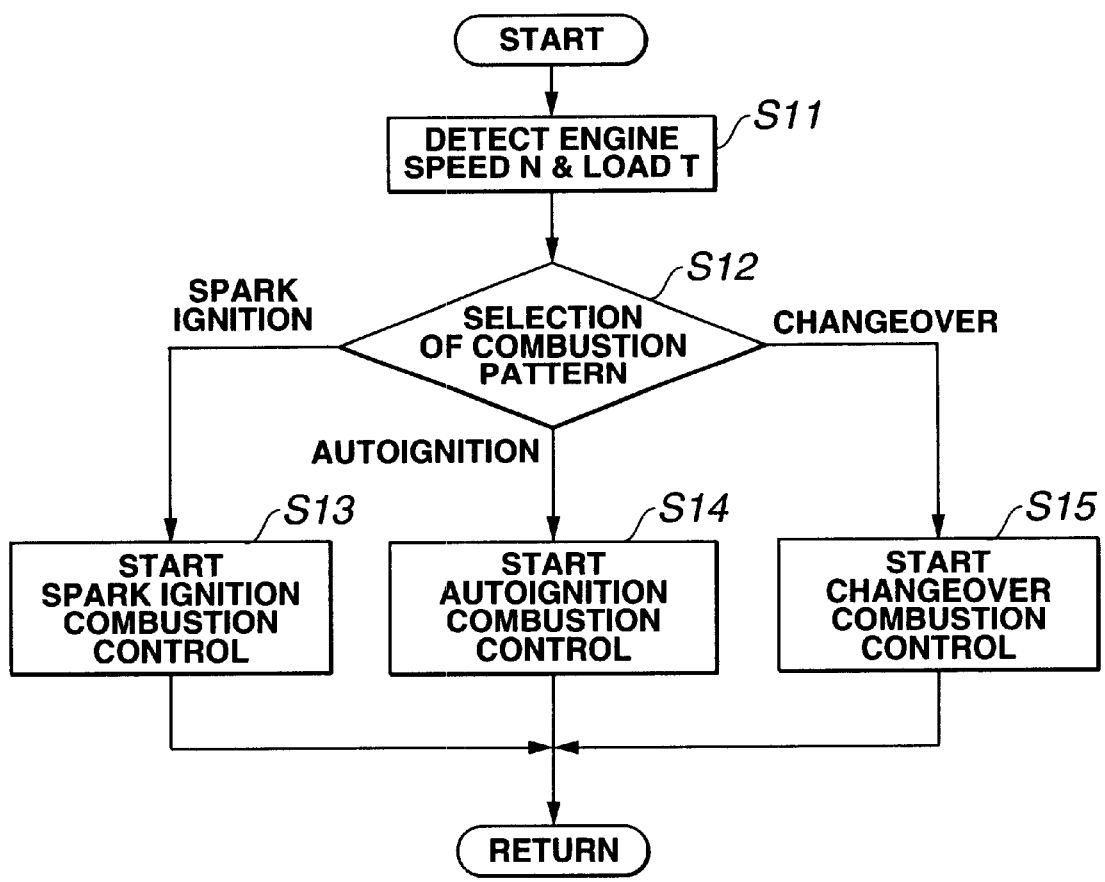
FIG. 9 is a flowchart showing a control flow for selection of a combustion pattern in the first embodiment.

FIG. 9 shows a main flow for controlling the combustion pattern.

Step S11 is to detect engine speed N and load T. Step S12 is to select a combustion pattern from the map shown in FIG. 2. When the spark ignition combustion is selected, the spark ignition combustion control is started at step S13. When the autoignition combustion is selected, the autoignition combustion control is started at step S14. Step S15 is to start a combustion changeover control when a combustion changeover is requested at step S12.

Figure 10:
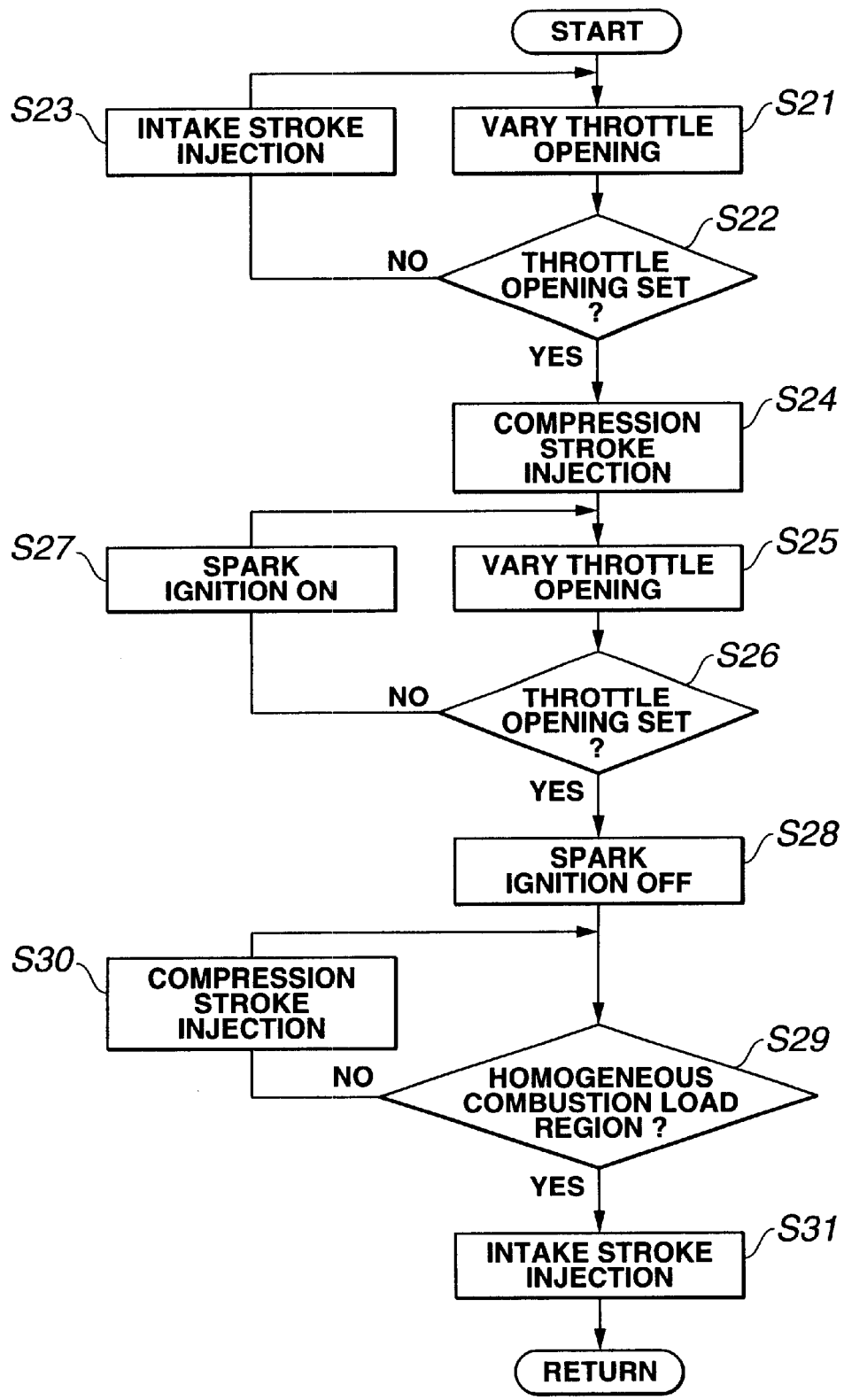
FIG. 10 is a flowchart showing a control flow for combustion changeover from the spark ignition combustion to the compression autoignition combustion in the first embodiment.

FIG. 10 shows a control flow for changeover from the spark ignition combustion to the compression autoignition combustion. Step S21 is a step to vary the throttle opening. Then, step S22 checks if the throttle opening is set to a desired target value shown in FIG. 7. If the setting of the throttle opening is not yet finished, step S23 continues intake stroke fuel injection to continue homogeneous charge spark ignition combustion. If the setting of the throttle opening is finished, control is transferred from step S22 to step S24 to perform compression stroke fuel injection to start stratified charge spark ignition combustion.

Step S25 is to adjust the throttle opening again. Step S26 checks if the throttle opening is set to a desired value shown in FIG. 7. If the setting of the throttle opening is not yet finished, the spark ignition is continued to continue the spark ignition combustion at step S27. If the setting of the throttle opening is finished, the spark ignition is switched off at step 528 to initiate the compression autoignition combustion. Step S29 is to check if the engine load is within a homogeneous charge combustion load region shown in FIG. 8. If the engine load is outside the homogeneous charge combustion load region, step S30 performs the compression stroke fuel injection to perform the stratified charge compression autoignition combustion. If the engine load is inside the homogeneous charge combustion load region, step S31 performs the intake stroke fuel injection to initiate homogeneous charge compression autoignition combustion.

Figure 11:
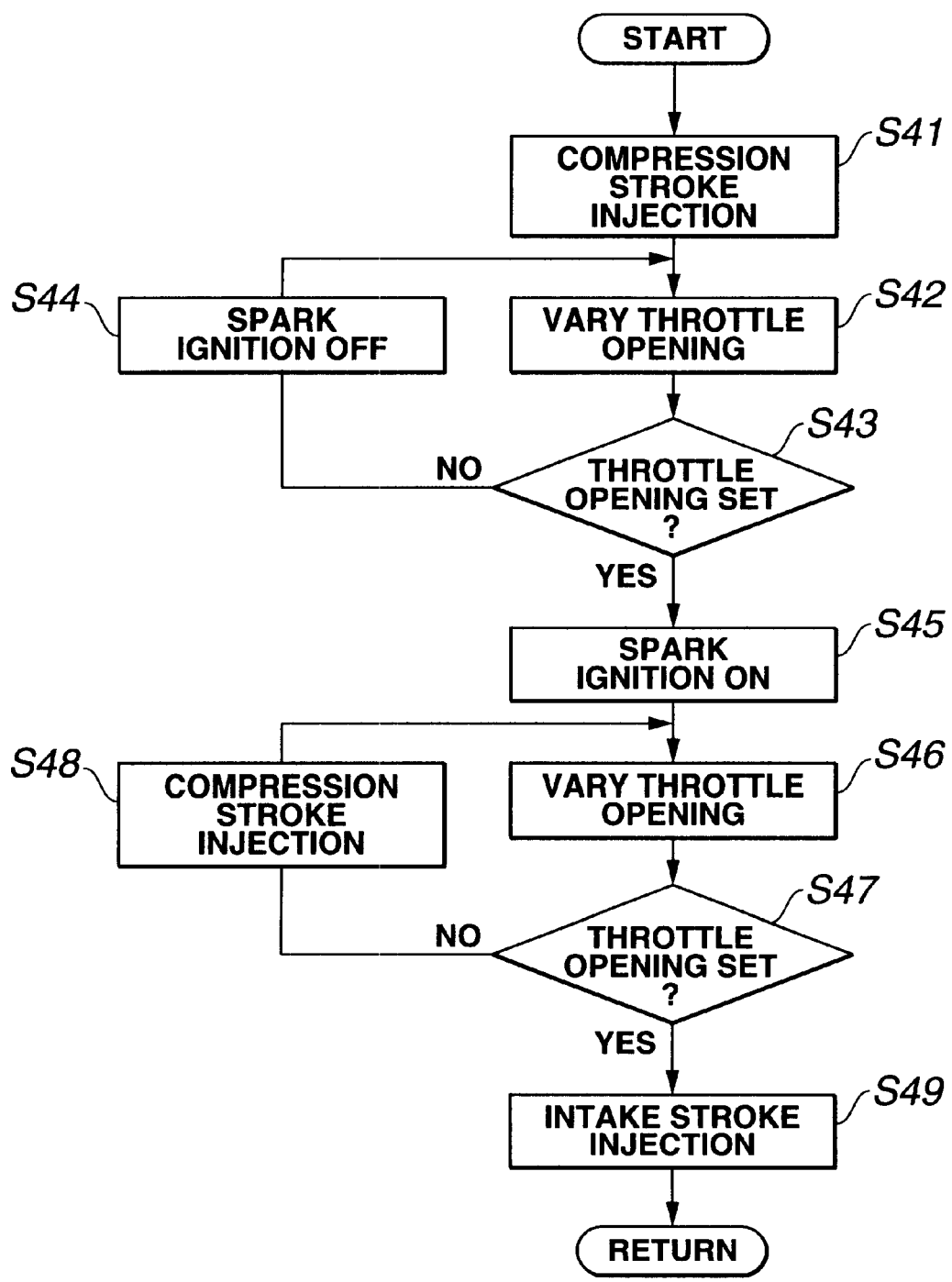
FIG. 11 is a flowchart showing a control flow for combustion changeover from the compression autoignition combustion to the spark ignition combustion in the first embodiment.

FIG. 11 shows a control flow for combustion changeover from the compression autoignition combustion to the spark ignition combustion.

If the combustion changeover is requested by the main flow of FIG. 9, first step S41 starts stratified charge compression autoignition combustion by the compression stroke fuel injection. Next step S42 is to adjust the throttle opening, and step S43 is to check if the throttle opening is set to a desired value as shown in FIG. 7. If the setting of the throttle opening is not yet finished, the compression autoignition combustion is continued at step S44 by holding the spark ignition off.

If the setting of the throttle opening is finished, the spark ignition combustion is initiated at step S45 by turning on the spark ignition. Step S46 adjusts the throttle opening again, and step S47 checks again if the throttle opening is set to a desired value shown in FIG. 7. If the setting of the throttle opening is not yet finished, the stratified charge spark ignition combustion is continued by the compression stroke fuel injection at step S48. If the setting of the throttle opening is finished, homogeneous charge spark ignition combustion is initiated by the intake stroke fuel injection at step S49.

Figure 12:
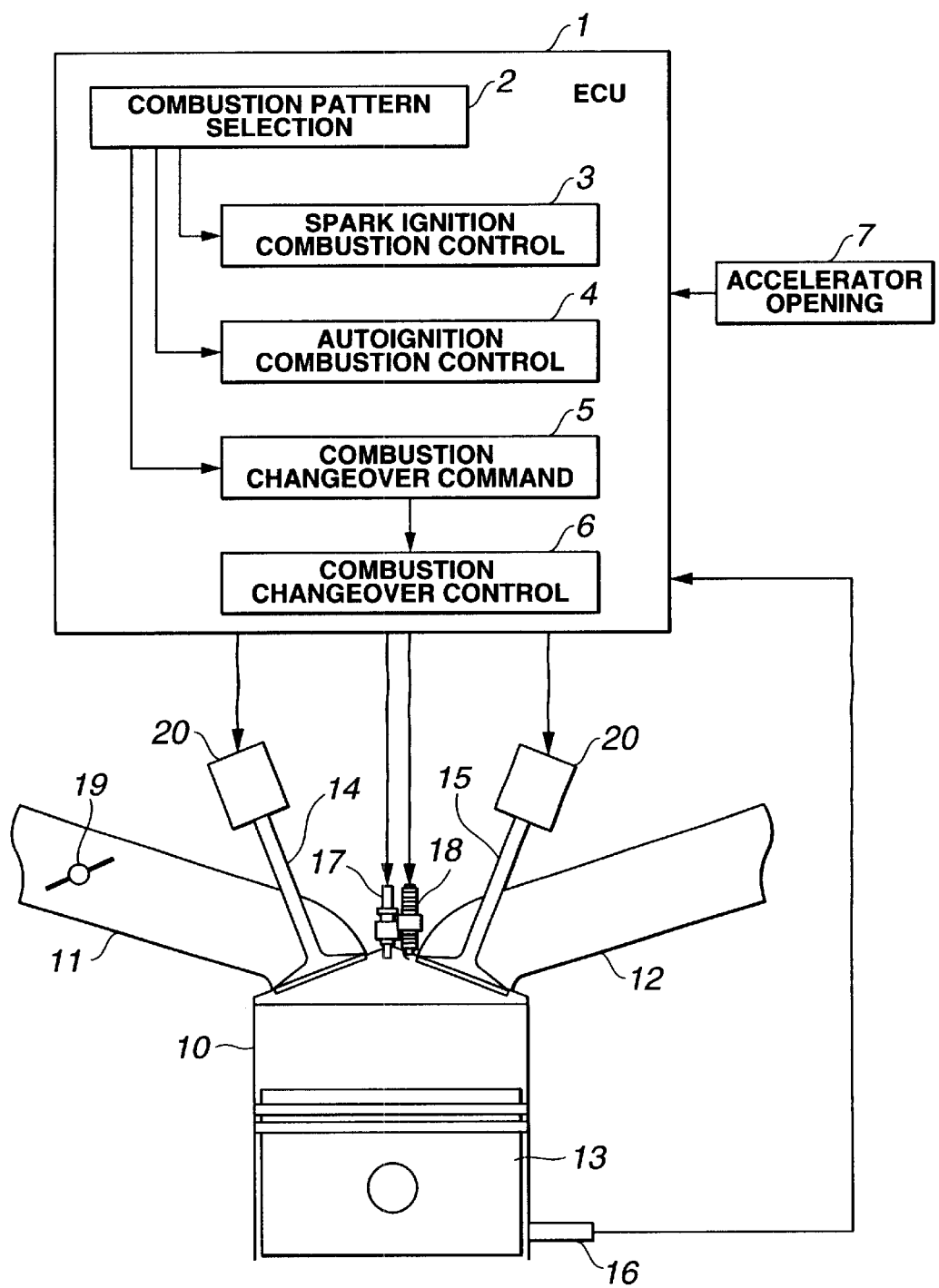
FIG. 12 is a schematic view showing a system of a compression autoignition gasoline engine according to a second embodiment of the present invention.

FIG. 12 shows a compression autoignition gasoline engine according to a second embodiment of the present invention. The engine according to the second embodiment additionally has a variable valve timing system including variable timing valve actuating mechanisms 20 for the intake and exhaust valves 14 and 15.

Figure 13A:
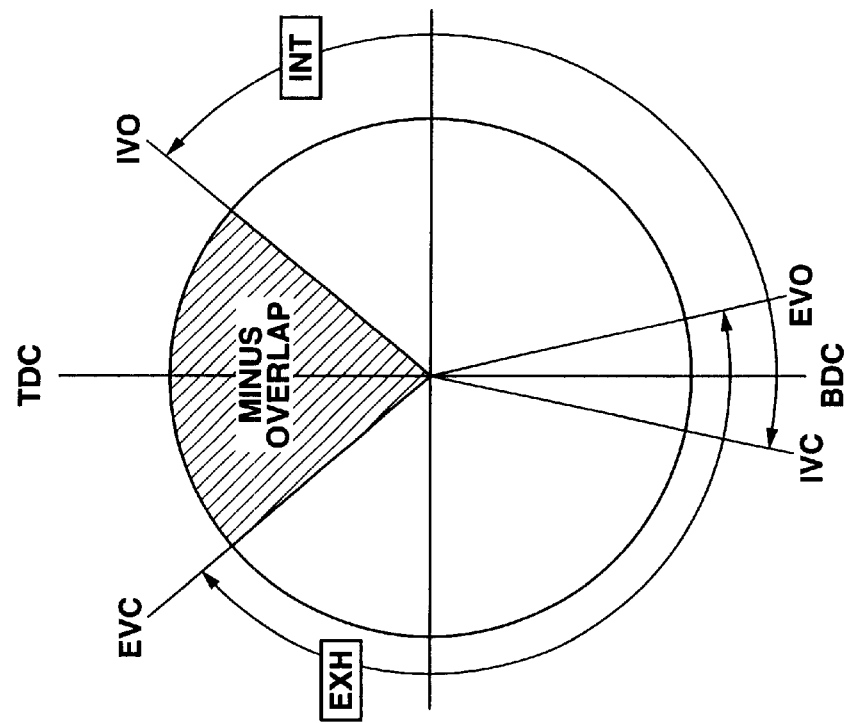
FIGS. 13A and 13B are diagrams illustrating opening and closing valve timings of intake and exhaust valves in two combustion modes of the compression autoignition gasoline engine according to the second embodiment.
Figure 13B:
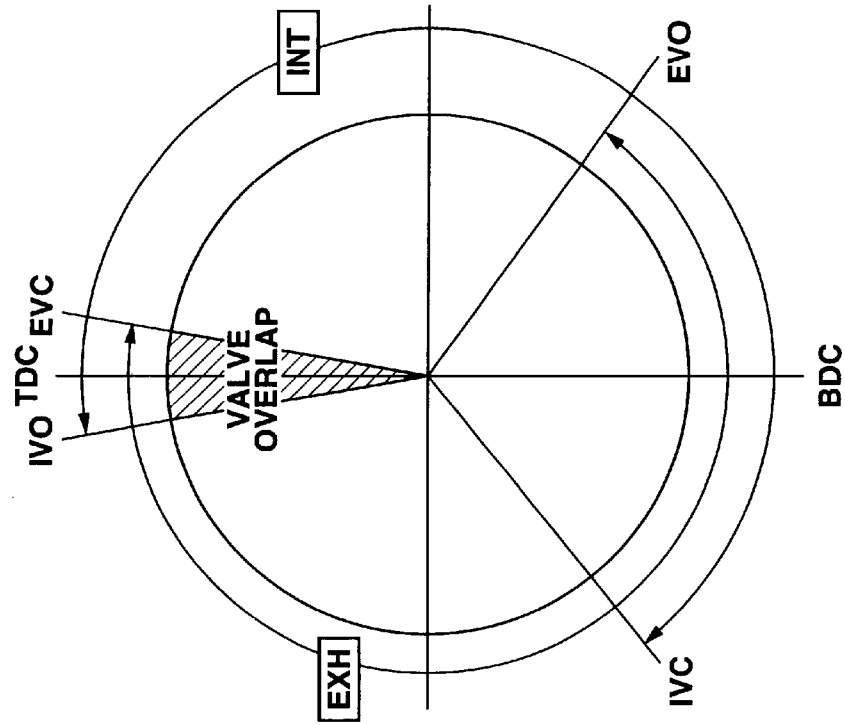

FIG. 13A is a valve timing diagram for the spark ignition combustion mode, and FIG. 13B is a valve timing diagram for the compression autoignition combustion mode. In the spark ignition combustion mode, the closing timing (EVC) of the exhaust valve (EXH) and the opening timing (IVO) of the intake valve (INT) are set around the piston top dead center to form a valve overlap as in an ordinary four cycle gasoline engine.

In the compression autoignition combustion mode in the case of combustion changeover in a predetermined operating region, the exhaust valve closing timing (EVC) is advanced, as compared to that in the spark ignition combustion mode, to close the exhaust valve on the exhaust stroke, and the intake valve opening timing (IVO) is retarded to open the intake valve during the intake stroke. The valve overlap around the piston top dead center is eliminated completely, and there is formed a minus overlap (−O/L) (or valve shutoff period).

By such valve timing adjustment to form the minus overlap in the compression autoignition combustion, the exhaust valve is closed halfway during the exhaust stroke, so that high temperature burnt gases in the then-existing volume of the combustion chamber is trapped in the combustion chamber and brought over to the next cycle as internal EGR gas. In the next engine cycle, the intake valve is opened during the intake stroke, and fresh air is inducted. The residual internal EGR gas gives heat to the inducted fresh air, and raises the in-cylinder temperature.

If fuel is injected during this minus overlap period, the heat of the high temperature gas trapped in the combustion chamber reforms the injected fuel, and improves the ignitability of the fuel so that the compression nonsparking autoignition combustion becomes possible at a lower load condition.

Figure 14:
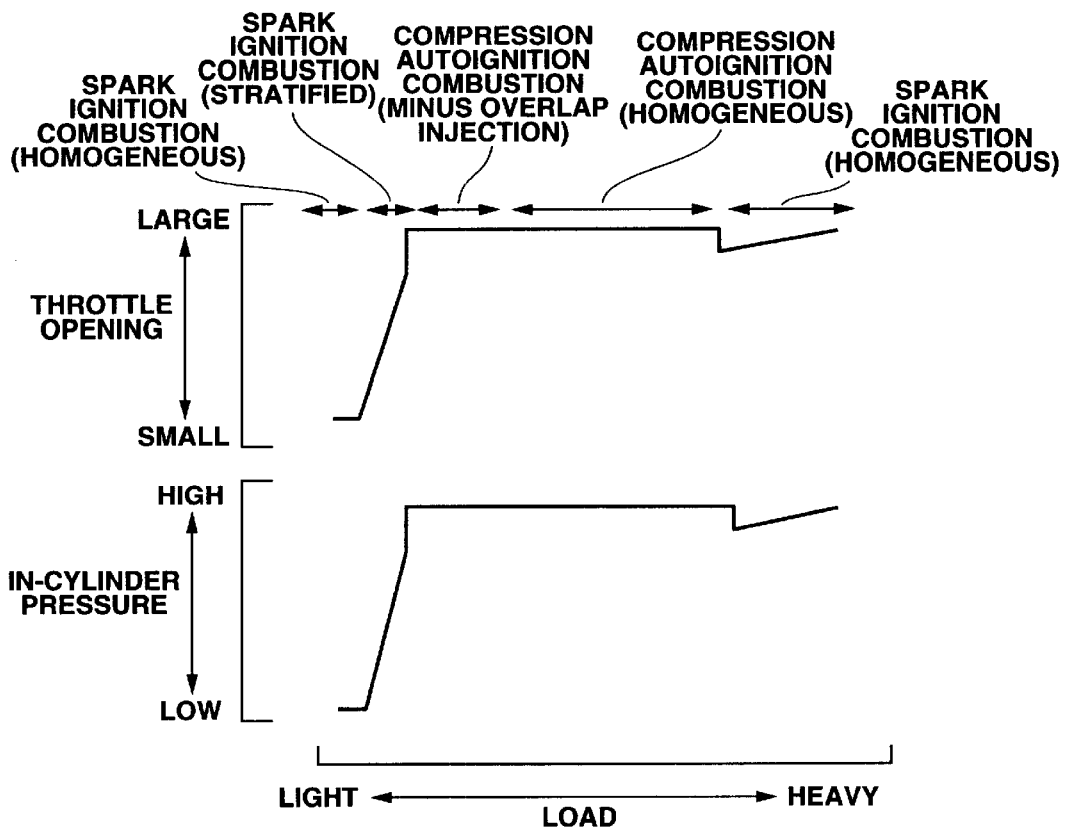
FIG. 14 is a graph for illustrating the throttle opening and in-cylinder pressure with respect to the load in the second embodiment.

FIG. 14 shows the throttle opening and in-cylinder pressure with respect to the load when the compression auto ignition combustion is performed in a light load region with fuel injection during the minus overlap. As compared to FIG. 7, the compression autoignition combustion becomes possible at lighter load levels, and hence the combustion changeover can be realized at lighter load levels. In a combustion changeover at a lighter load level, an amount of fuel for combustion is decreased, and the tendency to knocking is decreased for both the spark ignition combustion and compression autoignition combustion. Because of the decrease in the amount of burnt fuel, the amount of heat generated in the combustion process becomes smaller, and the possibility of knock decreases even when the combustion parameters such as in-cylinder pressure and temperature deviate from desired values in the process of combustion changeover.

Figure 15:
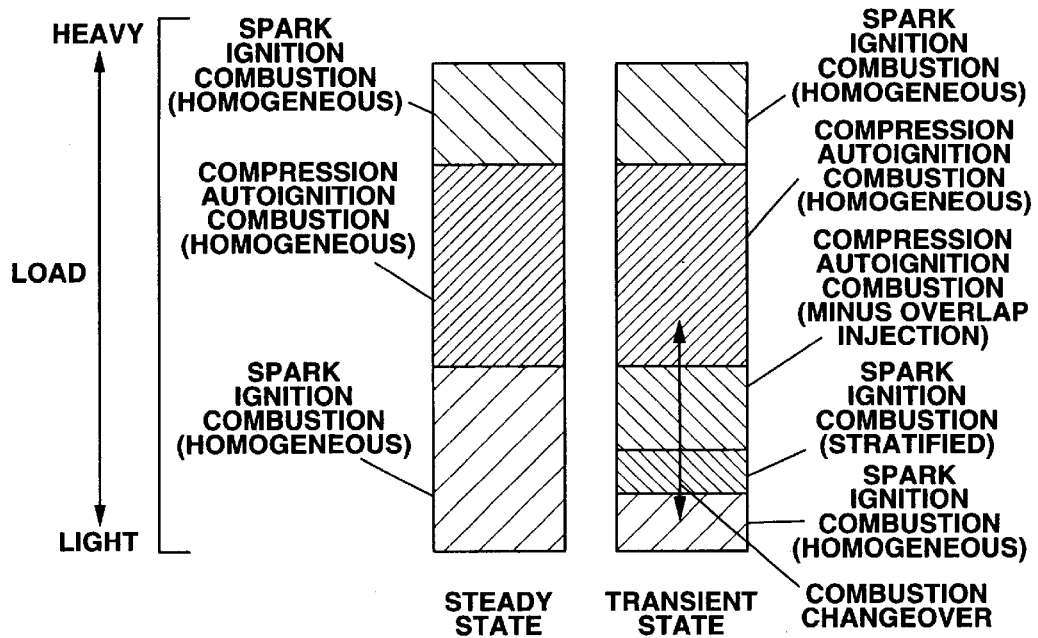
FIG. 15 is a view for illustrating combustion states in steady state operation and transient operation in the compression autoignition gasoline engine of the second embodiment.

FIG. 15 shows combustion modes in combustion changeover. In the case of steady state operation of the engine, the engine performs stoichiometric homogeneous charge spark ignition combustion when the load is very light, and performs homogeneous charge compression autoignition combustion when the load is medium. In the case of transient state operation with change in the load, there appear, in the increasing order of the load, stoichiometric homogeneous charge spark ignition combustion, stratified charge spark ignition combustion, minus overlap injection compression autoignition combustion and homogeneous charge compression autoignition combustion, as shown in FIG. 15.

The control flow for selecting a combustion patter in the second embodiment is identical to the flow shown in FIG. 9 in the first embodiment.

Figure 16:
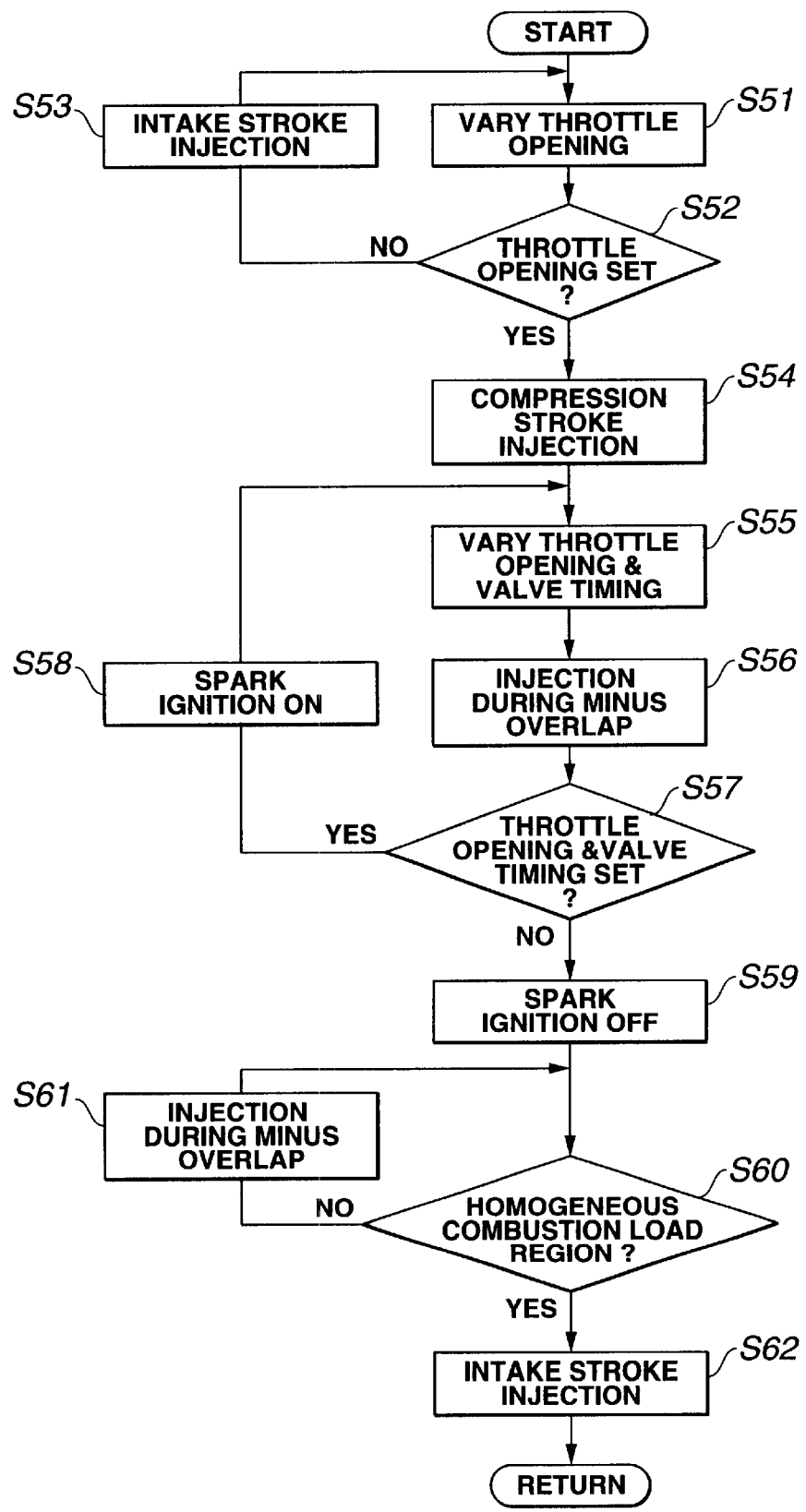
FIG. 16 is a flowchart showing a control flow for combustion changeover from the spark ignition combustion to the compression autoignition combustion in the second embodiment.

FIG. 16 shows a control flow for changeover from the spark ignition combustion to the compression autoignition combustion. The control flow of FIG. 16 is different from the flow of FIG. 10 in the following points. Step S55 adjusts the throttle opening and the valve timings. Step S56 starts minus overlap fuel injection. Step S57 checks if the throttle opening and the valve timings are set to desired values (shown in FIGS. 13 and 14). If the setting is not yet complete, step S58 continues the spark ignition combustion. If the setting is complete, step S59 turns off the spark ignition, and starts the compression autoignition combustion. Step S60 checks whether the engine operating state is in a predetermined homogeneous charge combustion region on the basis of FIG. 15. Outside the homogeneous charge combustion region, step 61 continues the minus overlap fuel injection. Inside the homogeneous charge combustion region, step S62 starts the intake stroke fuel injection to start the homogeneous charge compression autoignition combustion.

Figure 17:
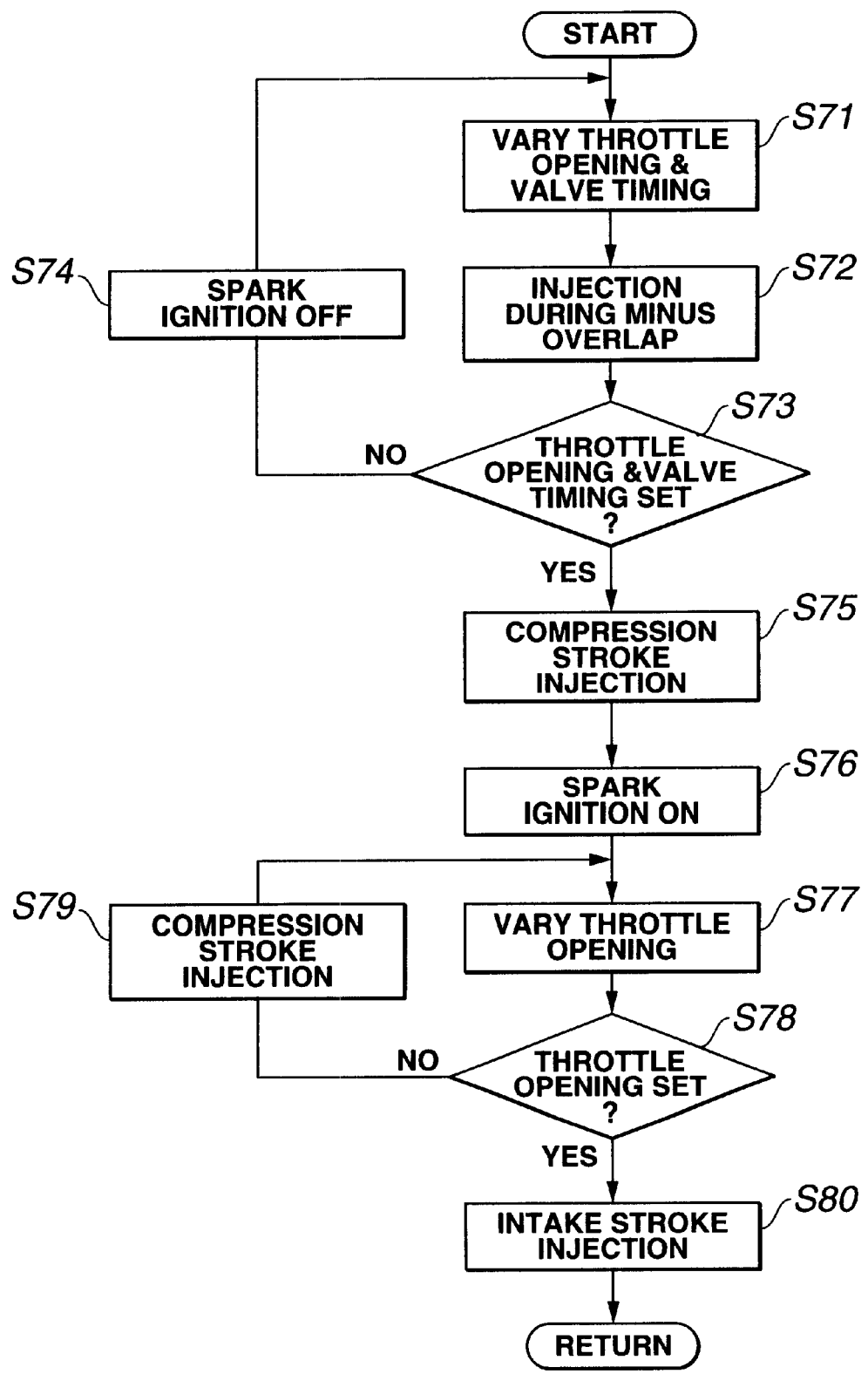
FIG. 17 is a flowchart showing a control flow for combustion changeover from the compression autoignition combustion to the spark ignition combustion in the second embodiment.

FIG. 17 shows a control flow for combustion changeover from the compression autoignition combustion to the spark ignition combustion according to the second embodiment. The control flow of FIG. 17 is different from the flow of FIG. 11 in the following points. Step S71 adjusts the throttle opening and the valve timings. Step S72 starts the minus overlap fuel injection. Step S73 checks if the setting of the throttle opening and valve timings is finished. If the setting is not yet finished, step S74 continues the compression autoignition combustion by holding the spark ignition off. If the setting is finished, step S75 changes the fuel injection timing to start the compression stroke fuel injection. Step S76 following step S75 starts the spark ignition to start the stratified charge spark ignition combustion.

Figure 18:
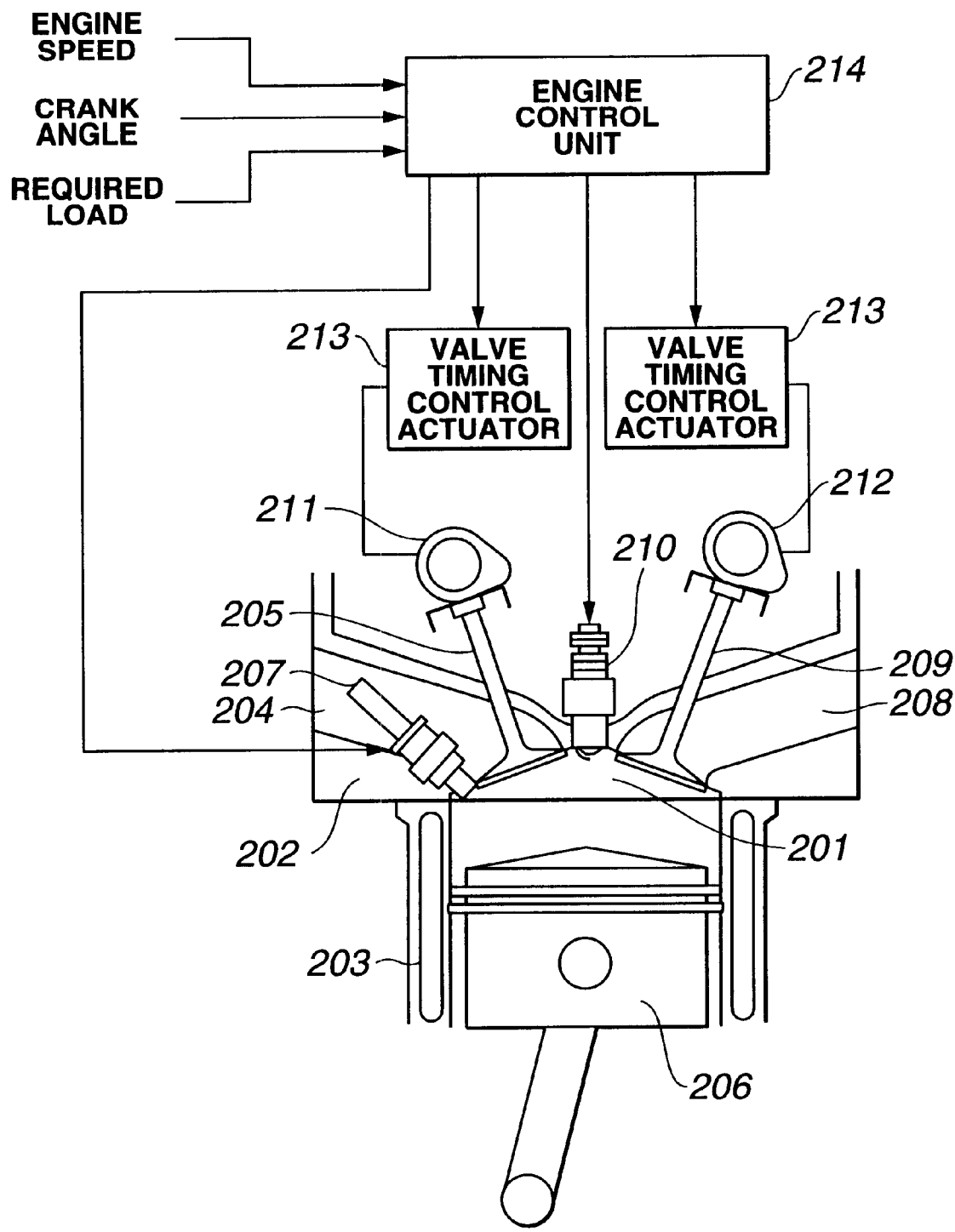
FIG. 18 is a schematic view showing a system of a compression autoignition gasoline engine according to a third embodiment of the present invention.

FIG. 18 shows a compression autoignition gasoline engine according to a third embodiment of the present invention.

A combustion chamber 201 is formed by a cylinder head 202, a cylinder block 203 and a piston 206. Cylinder head 2 has at least one intake port 204 provided with an intake valve 205, and at least one exhaust port 208 provided with an exhaust valve 209. Intake valve 205 and exhaust valve 209 are opened and closed through an intake cam 211 and an exhaust cam 212, respectively, by a valve actuating system.

A variable valve timing control system includes valve timing control actuators 213 for varying the opening and closing timings of intake and exhaust valves 205 and 208 under the control of an engine control unit 214. Engine control unit 214 can achieve a high temperature high pressure state enabling spontaneous ignition near compression stroke top dead center by varying the compression ratio and the amount of EGR in a low and medium load region of the engine.

An intake system includes a throttle valve (not shown in FIG. 18) for regulating an air quantity, and an air flowmeter (not shown). A fuel injector 207 is provided in cylinder head 202, to inject fuel directly into combustion chamber 201. Engine control unit 214 can control the fuel injection timing, the number of times of fuel injection, and the fuel injection quantity. A spark plug 210 is fixed to the cylinder head 202 by means of screw thread. Engine control unit 214 can control the spark ignition timing.

Figure 19A:
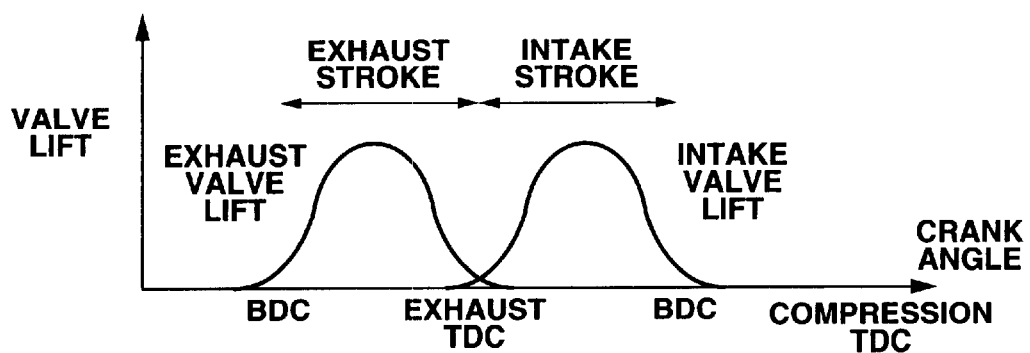
FIGS. 19A and 19B are graphs for illustrating valve opening and closing timings of intake and exhaust valves in the third embodiment.
Figure 19B:
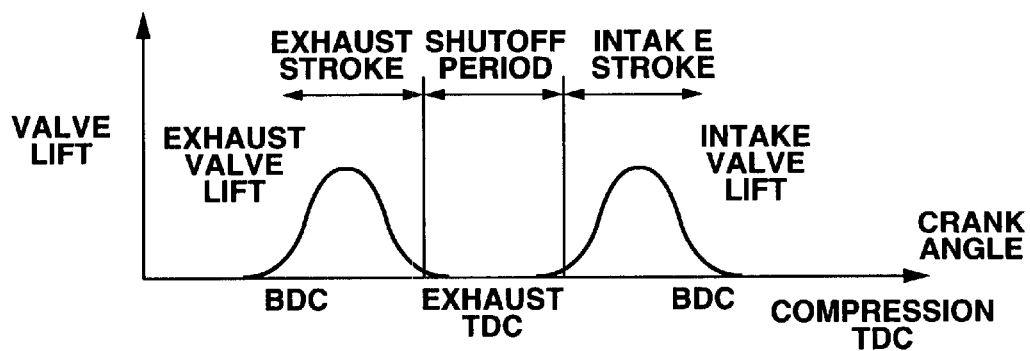

FIGS. 19A and 19B illustrate opening and closing timings of the intake and exhaust valves according to this embodiment. In the normal spark ignition combustion, the intake and exhaust valves are both open during a period called a valve overlap period from several degrees to several tens of degrees of crankshaft rotation around the exhaust top dead center (TDC). In the compression autoignition combustion, the valve shutoff period (or minus overlap period) during which the intake and exhaust valves are both closed is provided by decreasing the exhaust operating angle, shifting the exhaust valve closing timing (EVC) before the exhaust TDC, decreasing the intake operating angle and shifting the intake valve opening timing (IVO) after the exhaust TDC. U.S. Pat. No. 4,397,270 (corresponding to Japanese Published Patent Application Kokai No. S55(1980)-137305) and Japanese Published Patent Application Kokai No. H9(1997)-203307 show valve actuating systems capable of varying valve timings. Figures and explanations of these patent documents about the valve actuating systems are herein incorporated by reference.

In the compression autoignition combustion, hot exhaust gases are confined during the valve shutoff period, and used for heating the intake air, so that it is possible to initiate nonsparking compression autoignition combustion in the gasoline engine without increasing the compression ratio excessively. In this embodiment, moreover, this setting of the valve timing for the compression autoignition combustion is used also for the spark ignition combustion just before combustion changeover from the spark ignition combustion to the compression autoignition combustion.

FIG. 20 illustrates the combustion stability with respect to the air-fuel ratio (A/F) in the compression autoignition combustion and spark ignition combustion under the condition of constant throttle opening in the case in which the valve shutoff period is provided.

By injecting at least part of fuel during the valve shutoff period in the compression autoignition combustion, a stable combustion region can be expanded to the lean A/F side (to the low load side, that is). The fuel injected during the valve shutoff period is compressed together with self EGR gas mixture, exposed to a field of high temperature and high pressure, and reformed by reaction with oxygen in the self EGR gas mixture to the state making easier the compression autoignition.

Furthermore, by injecting at least part of fuel on the compression stroke in the compression autoignition combustion, it is possible to produce a rich A/F region of stratified air fuel mixture locally in the combustion chamber and thereby to achieve compression autoignition in a condition of leaner total A/F as a whole in the combustion chamber.

In FIG. 20, a broken line indicates a stable combustion region of stratified charge spark ignition combustion at the same valve shutoff period and the same throttle opening as the compression autoignition combustion. Even in a field of stratified air fuel mixture in which compression autoignition does not occur, it is possible to achieve flame propagation combustion in a predetermined A/F region, by producing a nucleus of flame by a spark.

Therefore, in this A/F region, as shown by an arrow in FIG. 20, a transition from the spark ignition combustion to the compression autoignition combustion is possible by changing the fuel injection timing while the throttle opening and the intake and exhaust valve timings are the same.

FIGS. 21A~21E show a process of combustion changeover according to the third embodiment of the present invention. The combustion changeover process is divided into first and second stages.

At the first stage, a transition takes place from spark ignition combustion of homogeneous premixed mixture at the theoretical mixture ratio with fuel injection on the intake stroke, to spark ignition combustion of stratified lean mixture with greater throttle opening and fuel injection on the compression stroke.

After the transition to the stratified lean combustion, the intake and exhaust valve timings are varied to form the valve shutoff period. As the valve shutoff period is made longer, the throttle opening is increased so as to compensate for a decrease in the fresh intake air quantity due to an increase of the self EGR gas quantity, to a position near the fully open throttle valve position. By this, the state shown by a small black circle in FIG. 20 is reached.

At the second stage, a transition from the spark ignition combustion to the compression autoignition combustion is carried out by changing the fuel injection timing from the compression stroke to the valve shutoff period to start a valve shutoff period fuel injection. The combustion state is shifted from the small black circle to a small white circle as shown by a solid line arrow in FIG. 20. At the same time, the fuel injection quantity is decreased to absorb a load change in the combustion changeover. This is due to the effect of improvement in thermal efficiency in the compression autoignition combustion. In the compression autoignition combustion, the time period of combustion is short, and hence the thermal efficiency is improved, as compared to the spark ignition combustion. In this case, it is possible to stop the discharge at the spark plug simultaneously with the transition to the compression autoignition combustion.

In FIG. 21A~21E, broken and one dot chain lines indicate characteristics when the load at the time of a combustion changeover is different from that in the above-mentioned base state. The broken lines show a case of lower load, and the one dot chain lines shows a case of higher load.

When the load is low at the time of a combustion changeover, to ensure the combustion stability in the spark ignition combustion, the opening of the throttle valve to a degree required in the compression autoignition combustion becomes unfeasible. In a transition at a low load from the spark ignition combustion to the compression autoignition combustion, the transition is carried out by shifting the fuel injection timing to the valve shutoff period as in the base state. However, because of the accompanying operation to open the throttle valve, the compression autoignition combustion tends to be unstable until the intake pressure rises.

To improve the stability of the compression autoignition combustion, the fuel is injected twice, at a first injection timing during the valve shutoff period and at a second injection timing during the compression stroke. The stability is thus improved by the effect of fuel reformation by the valve shutoff period fuel injection and the effect of stratification by the compression stroke fuel injection.

This switching operation of the fuel injection timing can be expressed by a broken line arrow from the small black circle to a small white triangle shown in FIG. 20. By the addition of the compression stroke fuel injection, there is formed, in the combustion chamber, a rich air fuel mixture field which facilitates the compression autoignition combustion.

It is possible to improve the combustion stability and reduce a torque change at the time of a combustion changeover by increasing the total fuel injection quantity immediately after the combustion changeover, as compared to the total fuel injection quantity at the end of the throttle opening operation.

In a combustion changeover from the spark ignition combustion to the compression autoignition combustion, it is optional to retard the spark timing in the spark ignition combustion immediately before the combustion changeover from the spark ignition combustion to the compression autoignition combustion, with respect to the spark timing in the steady state under the condition of equal engine speed and equal engine load. By this retardation, the control system can increase the temperature of the self EGR gas, and increase an amount of HC residing in the self EGR gas mixture, so that the compression autoignition combustion is reliably initiated immediately after the combustion changeover.

Moreover, it is possible to further improve the stability of the compression autoignition combustion at the time of a combustion changeover by producing a discharge in the spark plug about 30° before TDC in the compression autoignition combustion to increase the effect of fuel reformation. The discharge at the beginning of the compression autoignition combustion produces radicals acting to reform the fuel and facilitate the compression autoignition.

The injection of fuel in a total amount in the high load region would make excessive the heat generation at exhaust TDC, resulting in deterioration of the fuel consumption and knocking due to premature ignition in the compression autoignition combustion. Therefore, on the high load side, it is possible to prevent excessive reformation of the fuel by decreasing the fuel injection quantity of the injection during the valve shutoff period as compared to the quantity in the base state, and injecting the fuel twice first during the valve shutoff period and second during the intake stroke.

Figure 22:
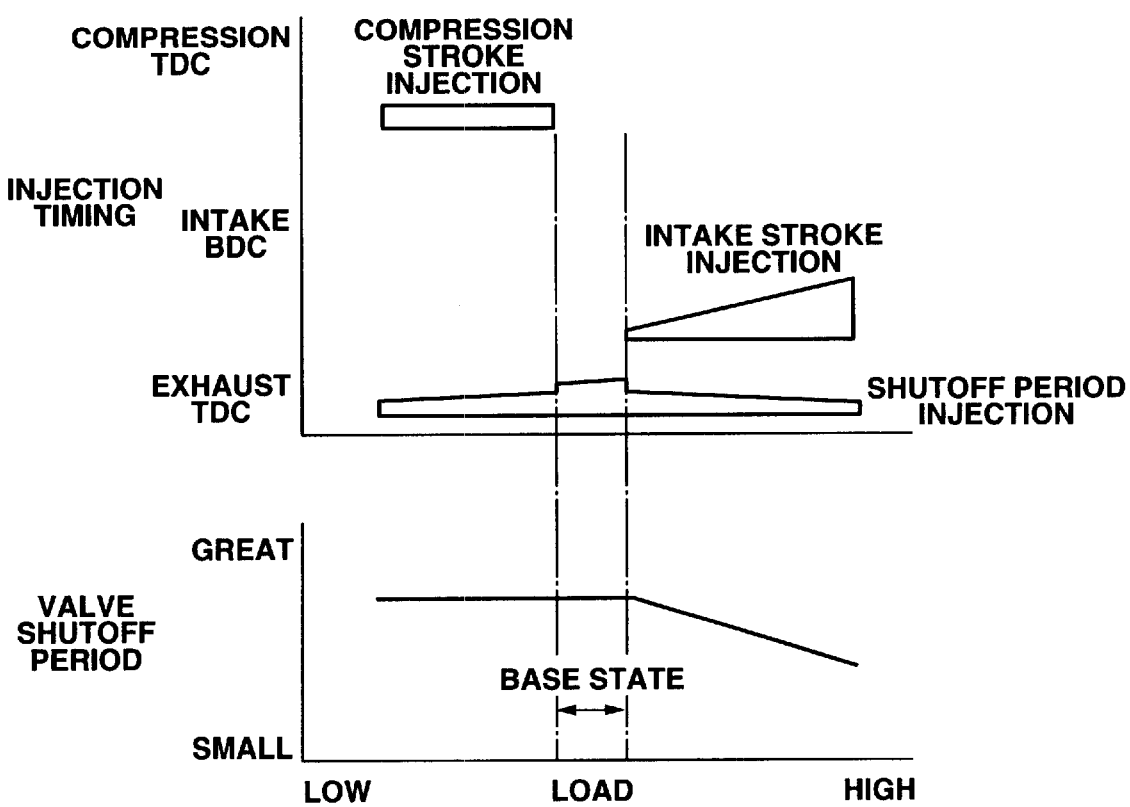
FIG. 22 is a view for illustrating different forms of the combustion changeover process of the third embodiment in different engine load regions.

FIG. 22 shows the fuel injection timing, and the valve shutoff period in combustion changeover processes in the base state, the low load state and the high load state, as explained above. In a transition from the spark ignition combustion to the compression autoignition combustion, the fuel injection may be performed twice, a first fuel injection of a first amount of fuel during the valve shutoff period and a second fuel injection of a second amount of fuel during a period from the valve shutoff period to an power stroke. The second fuel injection may be performed on the compression stroke when the load is lower and on the intake stroke when the load is higher. Thus, the control system can perform the fuel reformation during the compression stroke adequately and start the compression autoignition combustion stably. In the example of FIG. 22, the valve shutoff period is held at a constant length in a low load region to ensure the fuel reformation, and decreased with increase in the load in a high load region to prevent over fuel reformation and thereby to prevent knocking.

However, it is not always necessary to employ these three different combustion changeover processes since a load range adequate for a combustion changeover is affected by the base compression ratio of an engine, the intake air quantity and other factors.

A combustion changeover from the spark ignition combustion to the compression autoignition combustion is achieved by changing the fuel injection timing of the fuel injector for each cylinder. Therefore, it is easy to vary the timing of a combustion changeover from cylinder to cylinder. It is possible to decrease the engine torque change in a combustion changeover from the spark ignition combustion to the compression autoignition combustion by performing a changeover of the fuel injection timing sequentially cylinder by cylinder, or one cylinder group after another.

The amount of the fuel injected during the valve shutoff period may be increased as compared to an amount of fuel injected in normal compression autoignition combustion, to promote the fuel reformation and further improve the combustion stability at a start of the compression autoignition combustion.

In the present invention, the stratified charge spark ignition combustion in changeover from the spark ignition combustion to the compression autoignition combustion is effective for increasing the in-cylinder pressure in the combustion changeover, and thereby improving the stability of the compression autoignition combustion. The stratified charge spark ignition combustion in changeover from the compression autoignition combustion to the spark ignition combustion is effective for restraining an increase in the fuel quantity as compared to homogeneous charge spark ignition combustion, and preventing knock in the spark ignition combustion. The stratified charge compression autoignition combustion in changeover from the spark ignition combustion to the compression autoignition combustion is effective for improving the ignitability in the compression autoignition combustion, and improving the stability of the compression autoignition combustion. The stratified charge compression autoignition combustion in changeover from the compression autoignition combustion to the spark ignition combustion is effective for lowering the load at the time of the compression autoignition combustion, reducing the fuel injection quantity in the spark ignition combustion after the combustion changeover, and preventing knock. The valve shutoff period fuel injection in changeover from the spark ignition combustion to the compression autoignition combustion is effective for performing the combustion changeover from the spark ignition combustion to the compression autoignition promptly and reliably within one combustion cycle even if the response of the system for controlling the valve timings is slow. The valve shutoff period fuel injection in changeover from the compression autoignition combustion to the spark ignition combustion is effective for lowering the load at the time of the compression autoignition combustion, decreasing the fuel injection quantity in the spark ignition combustion after the changeover and thereby preventing knock.

This application is based on a prior Japanese Patent Application No. H11(1999)-261002 filed on Sep. 14, 2000 in Japan. The entire contents of this Japanese Patent Application No. 11-261002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A compression autoignition gasoline engine comprising:
    an actuating system comprising an in-cylinder fuel injection system to inject fuel directly into a combustion chamber, and an ignition system operative to change over combustion in the combustion chamber between spark ignition combustion and compression autoignition combustion in accordance with an engine operating condition; and
    a controlling system connected with the in-cylinder fuel injection system and the ignition system, to perform transient combustion in transition between the spark ignition combustion and the compression autoignition combustion, the transient combustion being stratified charge combustion performed by injecting the fuel on a compression stroke with the in-cylinder fuel injection system.

2. The compression autoignition gasoline engine as claimed in claim 1, wherein the transient combustion is stratified charge spark ignition combustion.

3. The compression autoignition gasoline engine as claimed in claim 2, wherein the transient combustion is the stratified charge spark ignition combustion performed before a start of the compression autoignition combustion in a combustion changeover from the spark ignition combustion to the compression autoignition combustion.

4. The compression autoignition gasoline engine as claimed in claim 3, wherein the controlling system controls the actuating system to perform the stratified charge spark ignition combustion after a start of the spark ignition combustion in a combustion changeover from the compression autoignition combustion to the spark ignition combustion.

5. The compression autoignition gasoline engine as claimed in claim 3, wherein, in the combustion changeover from the spark ignition combustion to the compression autoignition combustion, the controlling system performs the transient combustion which is the stratified charge spark ignition combustion before the start of the compression autoignition combustion, and further performs stratified charge compression autoignition combustion by injecting the fuel on the compression stroke just after the start of the compression autoignition combustion.

6. The compression autoignition gasoline engine as claimed in claim 5, wherein, in a combustion changeover from the compression autoignition combustion to the spark ignition combustion, the controlling system performs stratified charge compression autoignition combustion by injecting the fuel on the compression stroke before a start of the spark ignition combustion, and further performs stratified charge spark ignition combustion by injecting the fuel on the compression stroke just after the start of the spark ignition combustion.

7. The compression autoignition gasoline engine as claimed in claim 3, wherein the actuating system further comprises a variable valve timing control system to adjust intake and exhaust valve timings to form, between an exhaust stroke and an intake stroke in an engine cycle, a valve shutoff period during which the combustion chamber is shut off by closing both an intake valve and an exhaust valve; and wherein, in the combustion changeover from the spark ignition combustion to the compression autoignition combustion, the controlling system performs the transient combustion which is the stratified charge spark ignition combustion before the start of the compression autoignition combustion, and further performs, just after the start of the compression autoignition combustion, transient compression autoignition combustion by injecting the fuel during the valve shutoff period.

8. The compression autoignition gasoline engine as claimed in claim 7, wherein, in a combustion changeover from the compression autoignition combustion to the spark ignition combustion, the controlling system first performs compression autoignition combustion by injecting the fuel during the valve shutoff period before a start of the spark ignition combustion, and further performs stratified charge spark ignition transient combustion just after the start of the spark ignition combustion operation.

9. The compression autoignition gasoline engine as claimed in claim 1, wherein the transient combustion is stratified charge compression autoignition combustion.

10. The compression autoignition gasoline engine as claimed in claim 9, wherein the transient combustion is the stratified charge compression autoignition combustion performed just after a start of the compression autoignition combustion in a combustion changeover from the spark ignition combustion to the compression autoignition combustion.

11. The compression autoignition gasoline engine as claimed in claim 10 wherein, in a combustion changeover from the compression autoignition combustion to the spark ignition combustion operation, the controlling system performs stratified charge compression autoignition combustion by injecting the fuel on the compression stroke before a start of the spark ignition combustion.

12. The compression autoignition gasoline engine as claimed in claim 1, wherein, in a combustion changeover from the spark ignition combustion to the compression autoignition combustion, the controlling system controls the ignition system to retard a spark ignition timing just before a start of the compression autoignition combustion.

13. The compression autoignition gasoline engine as claimed in claim 12, wherein, after the combustion changeover from the spark ignition combustion to the compression autoignition combustion, the controlling system controls the ignition system to cause a discharge in a spark plug of the ignition system at a position about 30° before a top dead center of a compression stroke.

14. The compression autoignition gasoline engine as claimed in claim 1, wherein the controlling system carries out a combustion changeover from the spark ignition combustion to the compression autoignition combustion at a first combustion changeover timing for a first group of engine cylinders and at a second combustion changeover timing after the first combustion changeover timing for a second group of engine cylinders.

15. A compression autoignition gasoline engine comprising:
   an actuating system comprising,
      an in-cylinder fuel injection system to inject fuel directly into a combustion chamber,
      an ignition system operative to change over combustion in the combustion chamber between spark ignition combustion and compression autoignition combustion in accordance with an engine operating condition, and
      a variable valve timing control system to adjust intake and exhaust valve timings to form, between an exhaust stroke and an intake stroke in an engine cycle, a valve shutoff period during which the combustion chamber is shut off by closing both an intake valve and an exhaust valve; and
   a controlling system connected with the in-cylinder fuel injection system, the ignition system and the variable valve timing control system, to perform transient combustion in transition between the spark ignition combustion and the compression autoignition combustion, the transient combustion being combustion performed by injecting the fuel during the valve shutoff period with the in-cylinder fuel injection system.

16. The compression autoignition gasoline engine as claimed in claim 15, wherein the transient combustion is compression autoignition combustion performed by injecting the fuel during the valve shutoff period in a combustion changeover from the spark ignition combustion to the compression autoignition combustion.

17. The compression autoignition gasoline engine as claimed in claim 16, wherein the controlling system controls the actuating system to perform compression autoignition combustion by injecting the fuel during the valve shutoff period before a start of the spark ignition combustion in a combustion changeover from the compression autoignition combustion to the compression autoignition combustion.

18. The compression autoignition gasoline engine as claimed in claim 15, wherein the controlling system produces a combustion changeover request signal from the spark ignition combustion to the compression autoignition combustion in accordance with the engine operating condition, and control the variable valve timing control system to form the valve shutoff period by adjusting the intake and exhaust valve timings in response to the combustion changeover request signal.

19. The compression autoignition gasoline engine as claimed in claim 15, wherein, in a combustion changeover from the spark ignition combustion to the compression autoignition combustion, the controlling system controls the ignition system to retard a spark ignition timing just before a start of the compression autoignition combustion.

20. The compression autoignition gasoline engine as claimed in claim 19, wherein, after the combustion changeover from the spark ignition combustion to the compression autoignition combustion, the controlling system controls the ignition system to cause a discharge in a spark plug of the ignition system at a position about 30° before a top dead center of a compression stroke.

21. The compression autoignition gasoline engine as claimed in claim 15, wherein the controlling system carries out a combustion changeover from the spark ignition combustion to the compression autoignition combustion at a first combustion changeover timing for a first group of engine cylinders and at a second combustion changeover timing after the first combustion changeover timing for a second group of engine cylinders.

22. The compression autoignition gasoline engine as claimed in claim 16, wherein, in the combustion changeover from the spark ignition combustion to the compression autoignition combustion, the controlling system performs the transient combustion by injecting a first amount of fuel during the valve shutoff period and further injecting a second amount of fuel during the intake stroke or compression stroke in accordance with a load.

23. The compression autoignition gasoline engine as claimed in claim 22, wherein the amount of the fuel injected during the valve shutoff period is increased as compared to an amount of fuel injected in normal compression autoignition combustion.

24. The compression autoignition gasoline engine as claimed in claim 16, where the controlling system decreases the length of the valve shutoff period in accordance with a load at the time of the combustion changeover when the load is higher than predetermined level, and holds the length of the valve shutoff period substantially constant when the load is lower than or equal to the predetermined level.

25. A combustion changeover process for a compression autoignition gasoline engine having an in-cylinder fuel injector, comprising:
   requesting a combustion changeover from first combustion which is one of spark ignition combustion and compression autoignition combustion to second combustion which is the other of the spark ignition combustion and the compression autoignition combustion, in accordance with an engine operating condition; and
   performing transient combustion when the combustion changeover is requested, the transient combustion being performed by injecting fuel directly into a combustion chamber during a period during which the combustion chamber is closed by closing both an intake valve and an exhaust valve.

26. The combustion changeover process as claimed in claim 25, wherein the transient combustion is one of stratified charge combustion performed by injecting the fuel on a compression stroke, and combustion performed by injecting the fuel during a valve shutoff period during which the combustion chamber is fully closed, between an exhaust stroke and an intake stroke.

* * * * *